United States Patent
Berntorp et al.

(10) Patent No.: US 12,306,316 B2
(45) Date of Patent: May 20, 2025

(54) SYSTEM AND METHOD FOR CONTROLLING A DEVICE USING A COMPOUND PROBABILISTIC FILTER

(71) Applicant: Mitsubishi Electric Research Laboratories, Inc., Cambridge, MA (US)

(72) Inventors: Karl Berntorp, Cambridge, MA (US); Marcus Greiff, Cambridge, MA (US); Stefano Di Cairano, Cambridge, MA (US)

( * ) Notice: Subject to any disclaimer, the term of this patent is extended or adjusted under 35 U.S.C. 154(b) by 244 days.

(21) Appl. No.: 18/046,254

(22) Filed: Oct. 13, 2022

(65) Prior Publication Data

US 2024/0004085 A1 Jan. 4, 2024

Related U.S. Application Data

(60) Provisional application No. 63/367,447, filed on Jun. 30, 2022.

(51) Int. Cl.
   *G01S 19/39* (2010.01)
   *B60W 30/182* (2020.01)
   (Continued)

(52) U.S. Cl.
   CPC ......... *G01S 19/393* (2019.08); *B60W 30/182* (2013.01); *G01S 19/01* (2013.01); *G01S 19/22* (2013.01); *G01S 19/37* (2013.01); *B60W 2050/0008* (2013.01); *B60W 2050/0022* (2013.01); *B60W 2050/0031* (2013.01); *B60W 2050/0052* (2013.01); *B60W 60/001* (2020.02); *B60W 2556/35* (2020.02); *B60W 2556/50* (2020.02)

(58) Field of Classification Search
   CPC ........ G01S 19/393; G01S 19/01; G01S 19/22; G01S 19/37; B60W 30/182; B60W 60/001; B60W 2050/0008; B60W 2050/0022; B60W 2050/0031; B60W 2050/0052; B60W 2556/35; B60W 2556/50
   See application file for complete search history.

(56) References Cited

U.S. PATENT DOCUMENTS 10,976,444 B2 * 4/2021 Berntorp ................. G01S 19/44
11,501,193 B2 * 11/2022 Berntorp ............. G05B 13/048
(Continued)

OTHER PUBLICATIONS

Lundquist, Christian, and Thomas B. Schön. "Joint ego-motion and road geometry estimation." Information Fusion 12.4 (2011): 253-263.
(Continued)

*Primary Examiner* — Dale W Hilgendorf

(57) ABSTRACT

The present disclosure discloses a system and a method for controlling a device using a compound probabilistic filter. The method comprises collecting a sequence of measurements indicative of the state of the device at different control steps. Further, the method comprises executing iteratively a compound probabilistic filter configured to track the state of the device at each of the different control steps using the sequence of measurements to produce a sequence of states of the device corresponding to the sequence of measurements. Furthermore, the method comprises controlling the device using the tracked state of the device.

20 Claims, 30 Drawing Sheets

(51) Int. Cl.
*B60W 50/00* (2006.01)
*B60W 60/00* (2020.01)
*G01S 19/01* (2010.01)
*G01S 19/22* (2010.01)
*G01S 19/37* (2010.01)

(56) References Cited

U.S. PATENT DOCUMENTS

| | | | | |
|---|---|---|---|---|
| 11,597,364 | B2* | 3/2023 | Berntorp | B60T 8/1761 |
| 11,644,579 | B2* | 5/2023 | Berntorp | H04L 67/52 |
| | | | | 342/357.29 |
| 11,885,894 | B2* | 1/2024 | Greiff | G01S 19/393 |
| 11,947,022 | B2* | 4/2024 | Berntorp | G01S 19/24 |
| 2005/0179580 | A1* | 8/2005 | Cong | G01S 13/723 |
| | | | | 342/107 |
| 2005/0251328 | A1* | 11/2005 | Merwe | G01S 19/49 |
| | | | | 701/472 |
| 2019/0188592 | A1* | 6/2019 | Berntorp | G05B 13/048 |
| 2019/0302274 | A1* | 10/2019 | Berntorp | G01S 19/393 |
| 2020/0290577 | A1* | 9/2020 | Berntorp | B60W 40/068 |
| 2021/0278548 | A1* | 9/2021 | Berntorp | G01S 19/44 |
| 2022/0326393 | A1* | 10/2022 | Berntorp | G01S 19/393 |
| 2022/0326394 | A1* | 10/2022 | Berntorp | G01S 19/37 |
| 2023/0035711 | A1* | 2/2023 | Zheng | G01S 19/426 |
| 2023/0300774 | A1* | 9/2023 | Berntorp | G01S 5/0018 |
| | | | | 455/456.1 |
| 2023/0365154 | A1* | 11/2023 | Beauvisage | G06V 20/588 |
| 2024/0004088 | A1* | 1/2024 | Greiff | G01S 19/51 |
| 2024/0069508 | A1* | 2/2024 | Menner | G05B 13/041 |
| 2024/0077622 | A1* | 3/2024 | Kim | G06N 3/096 |

OTHER PUBLICATIONS

L. Hammarstrand, M. Fatemi, Á. F. Garcia-Fernández and L. Svensson, "Long-Range Road Geometry Estimation Using Moving Vehicles and Roadside Observations," in IEEE Transactions on Intelligent Transportation Systems, vol. 17, No. 8, pp. 2144-2158, Aug. 2016, doi: 10.1109/TITS.2016.2517701.

Caron, F.; Duflos, E.; Pomorski, D.; Vanheeghe, P. GPS/IMU data fusion using multisensor Kalman filtering: Introduction of contextual aspects. Inf. Fusion 2006, 7, 221-230.

* cited by examiner

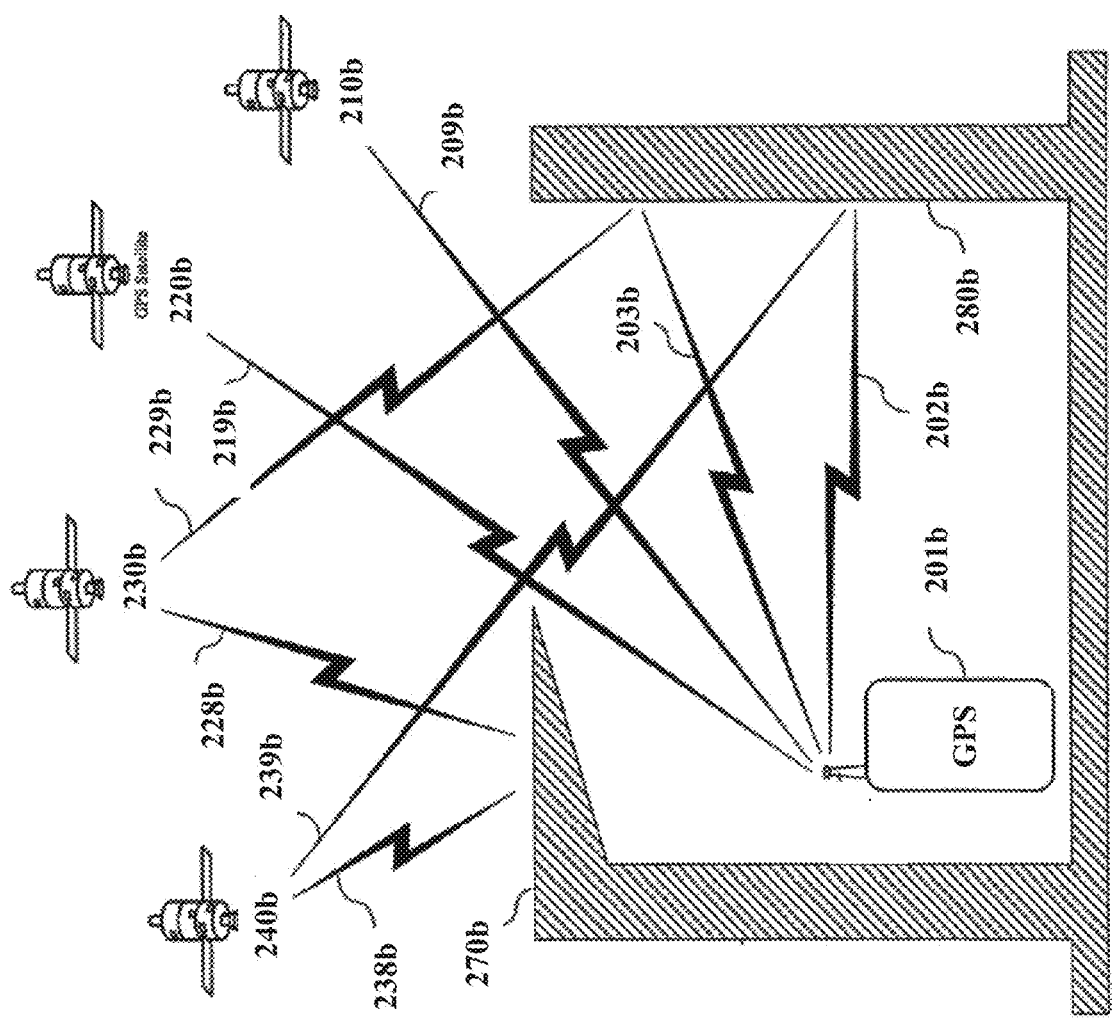

SYSTEM AND METHOD FOR CONTROLLING A DEVICE USING A COMPOUND PROBABILISTIC FILTER

TECHNICAL FIELD

This present disclosure relates generally to control and state tracking, and more particularly to a system and a method for controlling a device using a compound probabilistic filter.

BACKGROUND

Various control methods use probabilistic filters to estimate a state of a device under control. A probabilistic filter, such as a Kalman filter, uses a series of measurements observed over time, including statistical noise and other inaccuracies, and produces estimates of unknown variables that tend to be more accurate than those based on a single measurement alone.

The probabilistic filters work by a two-phase process that includes a prediction phase and an update phase. For the prediction phase, the probabilistic filter produces estimates of current state variables, along with their uncertainties. To that end, the probabilistic filter employs a prediction model subject to process noise. An example of the prediction model is a motion model of the device under control. Further, an outcome of the next measurement (corrupted with some error, including random noise) is observed and the estimates of current state variables are updated using a weighted average of the measurements, with more weight being given to measurements with greater certainty. To that end, the probabilistic filter employs a measurement model subject to measurement noise. Both the process noise and the measurement noise can be represented by a probability density function (PDF) showing a likelihood of possible variations of the estimated state and/or the measurements.

Usually, the process noise and the measurement noise are predetermined to reflect understanding of an uncertainty of the motion model and reliability of the measurements. However, in a number of applications, it is impractical to predetermine the measurement noise. For example, in vehicle control applications where a vehicle is controlled based on a state of the vehicle tracked using measurements of a Global Navigation Satellite System (GNSS), the GNSS measurements have different reliabilities at different instances of time. For example, at different instances of time different constellations of satellites can be in a line of sight of the GNSS receiver of the vehicle causing variations in the measurement noises. Additionally or alternatively, satellite signals can be subject to multipath adding significant noise to the GNSS measurements.

To that end, it is desired to adjust the measurement noise based on the state of the vehicle being tracked and control application. While it is possible to vary the measurement noise in the probabilistic filters, such as the Kalman filter, estimation of the measurement noise in real-time applications is computationally challenging and also can lead to divergence of the probabilistic filter. This challenge is in part due to difficulties in analysis of statistical properties of the measurements and assumptions underlying the operation of the probabilistic filter.

Hence, there is a need for a probabilistic filter framework that can adapt to different measurement noises in a computationally efficient manner.

SUMMARY

Some embodiments are based on the realization that internal variables and/or calculations of a probabilistic filter, like a Kalman filter, can be used to evaluate the correctness of measurement noise. Specifically, a metric of evaluation of the correctness of the measurement noise can be a likelihood of the measurement noise to correlate a current measurement indicative of a state of a device with a state predicted by a prediction model of the probabilistic filter.

This correlation can be illustrated by the following example. A predicted state of the device, e.g., a predicted state of a vehicle, is transformed into a domain of measurements, e.g., in a GNSS measurement space. For example, such a transformation can be executed using a model of the measurements. Next, the measurement noise is centered on the transformed state to produce a probabilistic distribution of expected measurements. In case of Gaussian probabilistic distribution used by the probabilistic filter, a mean of the Gaussian probabilistic distribution of the expected measurements is determined by a state predicted by the Kalman filter and a variance is one of a predetermined measurement noises. When the measurements for updating the predicted state are received, the measurements can be mapped on the probabilistic distribution of the expected measurements to estimate the sought likelihood of the correlation.

In such a manner, the measurement noise is evaluated using internal variables and/or calculations of the probabilistic filter without a need for additional statistical analysis of the measurements outside of the performance of the probabilistic filter. It shall be noted that the abovementioned example not only illustrates principles of correlation between state estimation and the measurements but can also be used to implement the estimation of this correlation. However, different embodiments can use different techniques to evaluate this correlation. For example, some embodiments use an evaluation of Kalman gains determined by the Kalman filter to update the predicted state and a covariance of the predicted state, which for an unbiased estimator is a mean-square error (MSE). Such calculations are internal to the probabilistic filters, i.e., computed anyway to track the state of the device. Hence, calculations of these variables do not require additional resources.

However, some embodiments are based on the realization that while the usage of the internal variables and/or calculations of the probabilistic filter can reduce the computational requirements for the evaluation of the correctness of the selected measurement noise, the evaluation itself becomes corrupted by internal performance of the probabilistic filter. In other words, the correctness of the measurement noise is not necessarily the true correctness reflecting the measurements independent of the Kalman filter, but the correctness from the point of view of the probabilistic filter itself. To that end, it may be problematic to use this evaluation to adapt the measurement noise, but rather to use this evaluation to evaluate the performance of the probabilistic filter with the selected measurement noise.

To address this problem, some embodiments use multiple probabilistic filters with different measurements noises and determine the state of the device as a weighted combination of the states estimated by different filters with weights of each filter derived from the corresponding evaluation of the likelihood of the measurement noise to correlate the current measurement indicative of the state of the device with the state predicted by a prediction model of the probabilistic filter. In such a manner, different measurement noises can be considered without a need to analyze the statistical properties of the measurements.

Some embodiments are based on the realization that current methods of tracking a state of a vehicle based on satellite signals received from a global navigation satellite system (GNSS) are sensitive to satellite measurements being of high qualitative because otherwise, the tracking method cannot produce high-accuracy estimates. Other embodiments are based on the recognition that there is a necessity to combine various sensors to improve state tracking. The various sensors complement each other because such a combination is more likely to produce sensible estimates in a larger variety of conditions. For example, one embodiment combines a GNSS position measurement with a camera relative position measurement and a map of road to track the state of the vehicle. Another embodiment combines a camera measuring a relative position of vehicles neighboring the own vehicle and a lidar measurement measuring the relative position of vehicles neighboring the own vehicle because such measurements complement each other due to the difference in construction of the camera and lidar, respectively.

Some embodiments utilize the probabilistic filter to fuse measurements and generate a state estimate. The probabilistic filters need a probabilistic description of the measurements, a measurement model. To this end, some embodiments recognize that measurement noise characteristics need to be determined for the measurement model to be used in the probabilistic filter. Some embodiments are based on the understanding that to use the probabilistic measurement model in a measurement update, an accuracy of the sensor measurements needs to be determined concurrently with the tracking of the state of the vehicle because the tracking is performed in real-time and the measurement model, therefore, may not be set before executing the recursive probabilistic filter. Some embodiments exploit this understanding to adapt the measurement noise used in the probabilistic measurement model as sensor measurements arrive at the compound probabilistic filter.

To that end, some embodiments jointly estimate the state of the vehicle and the measurement noise of the different sensors to determine the measurement noise that best describes the state of the vehicle according to the measurements. For example, one embodiment associates a first noise value with a first sensor and a second noise value with a first sensor, and additionally associates a first noise value with a second sensor and a second noise value with a second sensor and executes multiple probabilistic filters for each combination of noise values and sensors to determine which one of them best describes the state of the vehicle. In other embodiments, the multiple probabilistic filters are unified into a compound probabilistic filter that weighs together the multiple probabilistic filters as a weighted combination of the multiple filters.

Some embodiments are based on the understanding that if a probabilistic filter using a particular combination of noise values for various sensors gave the best fit at a previous time step, it is likely to also produce a good fit for the next time step. For example, if a GNSS position measurement was unreliable in a previous time step due to, e.g., multipath in an urban environment, it is likely to be prone to multipath also in the next time step. However, it also has a chance of producing a reliable measurement if the unreliability of the measurement is not an effect of multipath but due to some other unmodeled disturbance. Some embodiments use this understanding to integrate and weight the multiple probabilistic filters at each time step of control such that the probabilistic filters are given different weightings based on their weights at previous time steps.

Some embodiments are based on the understanding that the computational complexity of the multiple probabilistic filters grows unfavorably with a number of hypotheses of noise values and the number of sensors. For instance, one embodiment understands that using different possible noise values can be interpreted as gridding of a continuous space of possible noise values such that there is an exponential complexity in the number of possible combinations of noise values and therefore the number of probabilistic filters employed in the estimation.

Some embodiments realize that in automotive applications the computational power of automotive-grade electronic control units is limited and using a large number of probabilistic filters is not computationally feasible. One embodiment remedies this by selecting a subset of the probabilistic filters to be used in the estimation. For instance, one embodiment selects probabilistic filters corresponding to values of noise levels close to those that were well represented the state at the previous time step. Doing in such a manner enables the subset of probabilistic filters chosen at each time step to follow the evolution of the sensor quality.

Accordingly, one embodiment discloses a feedback controller for controlling a movement of a device based on a state of the device tracked using measurements of the movement indicative of the state of the device. The feedback controller comprises at least one processor; and at least one memory having instructions stored thereon that, when executed by the at least one processor, causes the feedback controller to: collect a sequence of measurements indicative of the state of the device at different control steps and execute iteratively a compound probabilistic filter configured to track the state of the device at each of the different control steps using the sequence of measurements to produce a sequence of states of the device corresponding to the sequence of measurements. To perform an iteration for a current control step using a current measurement, the compound probabilistic filter is configured to execute multiple probabilistic filters parameterized on the state of the device to produce multiple estimates of the state of the device for the current control step, wherein each of the multiple probabilistic filters iteratively predicts a current state of the device using a prediction model subject to process noise and updates the predicted current state based on the current measurement using a measurement model subject to a measurement noise, wherein different probabilistic filters of the multiple probabilistic filters have different measurement noises causing variations in the multiple estimates of the state of the device; estimate, for each of the multiple probabilistic filters, a likelihood of corresponding measurement noise to correlate the current measurement with the predicted current state; and combine the multiple estimates of the state of the device into a weighted combination with normalized weights derived from the likelihoods estimated for corresponding probabilistic filters; output the state of the device tracked by the compound probabilistic filter for the current control step based on the weighted combination. The feedback controller is further configured to control the device using the sequence of states tracked by the compound probabilistic filter.

Accordingly, another embodiment discloses a method for controlling a movement of a device based on a state of the device tracked using measurements of the movement indicative of the state of the device. The method comprises collecting a sequence of measurements indicative of the state of the device at different control steps and executing iteratively a compound probabilistic filter configured to track the state of the device at each of the different control steps using the sequence of measurements to produce a sequence of states of the device corresponding to the sequence of measurements. To perform an iteration for a current control step using a current measurement, the compound probabilistic filter is configured to execute multiple probabilistic filters parameterized on the state of the device to produce multiple estimates of the state of the device for the current control step, wherein each of the multiple probabilistic filters iteratively predicts a current state of the device using a prediction model subject to process noise and updates the predicted current state based on the current measurement using a measurement model subject to a measurement noise, wherein different probabilistic filters of the multiple probabilistic filters have different measurement noises causing variations in the multiple estimates of the state of the device; estimate, for each of the multiple probabilistic filters, a likelihood of corresponding measurement noise to correlate the current measurement with the predicted current state; and combine the multiple estimates of the state of the device into a weighted combination with normalized weights derived from the likelihoods estimated for corresponding probabilistic filters; output the state of the device tracked by the compound probabilistic filter for the current control step based on the weighted combination. The method further comprises controlling the device using the sequence of states tracked by the compound probabilistic filter.

Accordingly, yet another embodiment discloses non-transitory computer-readable storage medium embodied thereon a program executable by a processor for performing a method for controlling a movement of a device based on a state of the device tracked using measurements of the movement indicative of the state of the device. The method comprises collecting a sequence of measurements indicative of the state of the device at different control steps and executing iteratively a compound probabilistic filter configured to track the state of the device at each of the different control steps using the sequence of measurements to produce a sequence of states of the device corresponding to the sequence of measurements. To perform an iteration for a current control step using a current measurement, the compound probabilistic filter is configured to execute multiple probabilistic filters parameterized on the state of the device to produce multiple estimates of the state of the device for the current control step, wherein each of the multiple probabilistic filters iteratively predicts a current state of the device using a prediction model subject to process noise and updates the predicted current state based on the current measurement using a measurement model subject to a measurement noise, wherein different probabilistic filters of the multiple probabilistic filters have different measurement noises causing variations in the multiple estimates of the state of the device; estimate, for each of the multiple probabilistic filters, a likelihood of corresponding measurement noise to correlate the current measurement with the predicted current state; and combine the multiple estimates of the state of the device into a weighted combination with normalized weights derived from the likelihoods estimated for corresponding probabilistic filters; output the state of the device tracked by the compound probabilistic filter for the current control step based on the weighted combination. The method further comprises controlling the device using the sequence of states tracked by the compound probabilistic filter.

Accordingly, some embodiments disclose a controller for controlling a movement of a vehicle based on a state of the vehicle tracked using measurements of a Global Navigation Satellite System (GNSS). The controller comprises at least one processor; and at least one memory having instructions stored thereon that, when executed by the at least one processor, causes the controller to collect a sequence of GNSS measurements indicative of the state of the vehicle at different control steps and execute iteratively a compound probabilistic filter configured to track the state of the vehicle at the different control steps using the sequence of GNSS measurements to produce a sequence of states of the vehicle corresponding to the sequence of GNSS measurements. To perform an iteration for a current control step using a current GNSS measurement, the compound probabilistic filter is configured to execute multiple probabilistic filters having identical measurement models relating the current GNSS measurement with a current estimation of the state of the vehicle to produce multiple estimates of the state of the vehicle for the current control step, wherein the multiple probabilistic filters are subject to different measurement noises causing variations among the multiple estimates of the state of the vehicle; combine the multiple estimates of the state of the vehicle into a weighted combination with weights derived from likelihoods of the current GNSS measurement according to different measurement noises centered on an estimation of the current GNSS measurement predicted by one or a combination of the multiple probabilistic filters; and estimate the state of the vehicle tracked by the compound probabilistic filter for the current control step based on the weighted combination. The controller is further configured to control the vehicle using the sequence of states estimated by the compound probabilistic filter.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2B shows an illustration of a scenario where multipath disturbs signals for a receiver, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
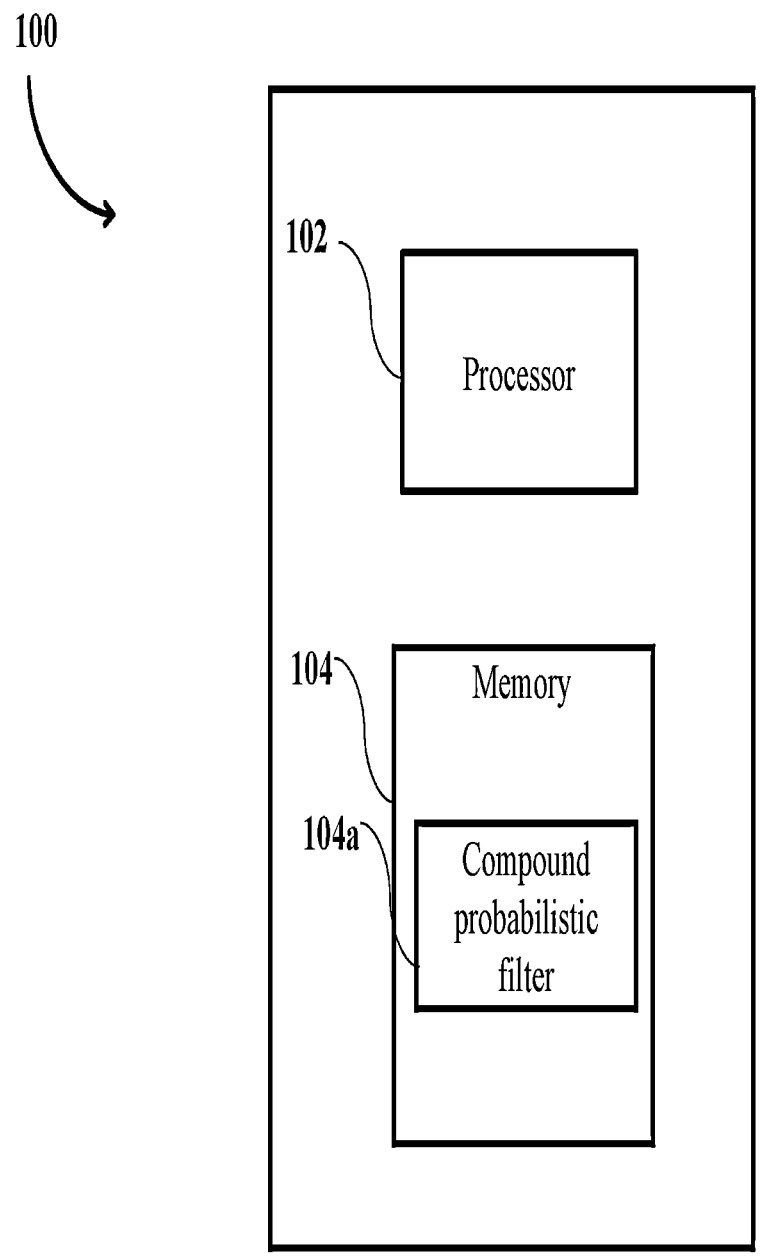
FIG. 1A shows a block diagram of a feedback controller for controlling a movement of a device, according to an embodiment of the present disclosure.

FIG. 1A shows a block diagram of a feedback controller 100 for controlling a movement of a device, according to an embodiment of the present disclosure. The feedback controller 100 includes a processor 102 and a memory 104. The processor 102 may be a single core processor, a multi-core processor, a computing cluster, or any number of other configurations. The memory 104 may include random access memory (RAM), read only memory (ROM), flash memory, or any other suitable memory systems. Additionally, in some embodiments, the memory 104 may be implemented using a hard drive, an optical drive, a thumb drive, an array of drives, or any combinations thereof. In an embodiment, the memory 104 stores a compound probabilistic filter 104a. The compound probabilistic filter 104a is explained in detail in FIG. 1B. In an embodiment, the feedback controller 100 may be communicatively coupled to the device. The device may be a vehicle, a robot, a drone, or the like. The feedback controller 100 is configured to execute various functions to control the movement of the device, as explained in FIG. 1B.

Figure 1B:
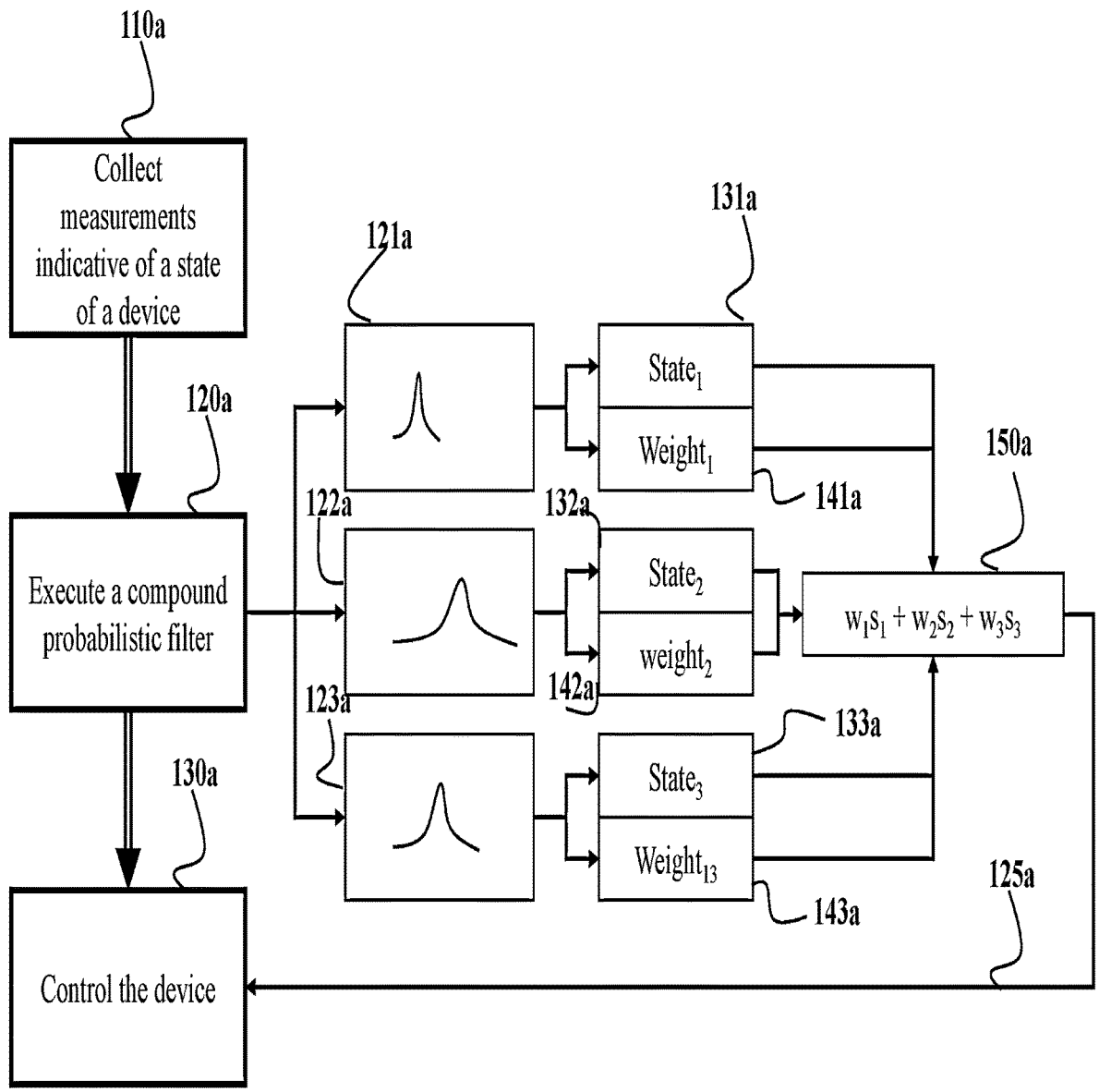
FIG. 1B shows a schematic for controlling the movement of the device, according to some embodiments of the present disclosure.

FIG. 1B shows a schematic for controlling the movement of the device, according to some embodiments of the present disclosure. The feedback controller 100 controls the device based on a state of the device tracked using measurements indicative of the state of the device. For example, if the device is a vehicle, the state of the device may include one or a combination of a position of the vehicle, a heading angle of the vehicle, and a velocity of the vehicle. In an embodiment, the measurements indicative of the state of the device may correspond to sensor measurements. In other words, the measurements indicative of the state of the device may be obtained from one or more sensors. For instance, measurements indicative of a speed of the vehicle may be obtained from a speed sensor of the vehicle.

The feedback controller 100, at first, collects 110a a sequence of measurements indicative of the state of the device at different control steps. Further, the feedback controller 100 executes 120a iteratively the compound probabilistic filter 104a configured to track the state of the device at each of the different control steps using the sequence of measurements to produce a sequence of states 125a of the device corresponding to the sequence of measurements. Further, the feedback controller 100 controls 130a the device using the sequence of states 125a tracked by the compound probabilistic filter 104a.

To perform an iteration for a current control step using a current measurement, the compound probabilistic filter 104a is configured to execute multiple probabilistic filters 121a, 122a, and 123a parameterized on the state of the device to produce multiple estimates of the state of the device for the current control step. For example, a filter 121a produces a state 131a, a filter 122a produces a state 132a, and a filter 123a produces a state 133a.

Each of the multiple probabilistic filters 121a-123a is a probabilistic filter that iteratively predicts a current state of the device using a prediction model subject to process noise and updates the predicted current state based on the current measurement using a measurement model subject to measurement noise.

Figure 1C:
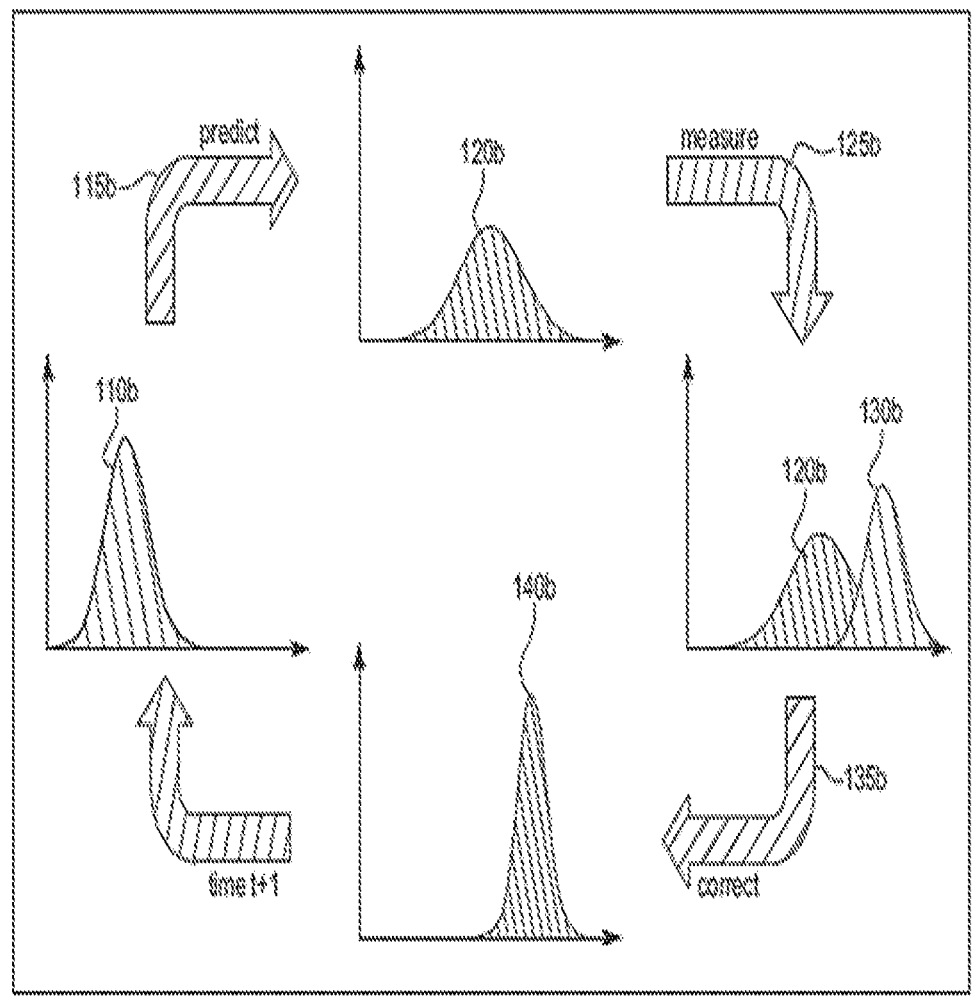
FIG. 1C shows an illustration of an iterative state tracking by probabilistic filters, according to some embodiments of the present disclosure.

FIG. 1C shows an illustration of an iterative state tracking by the probabilistic filters of some embodiments. Starting with a state estimate 110b determined for a previous iteration, a probabilistic filter predicts 115b a current state 120b of the device for a current iteration using the prediction model subject to process noise, such that the current state 120b can be defined by parameters of the probabilistic distribution. Upon receiving current measurements 125b, the probabilistic filter updates or corrects 135b the predicted current state 120b according to the measurement model connecting the measurements with the predicted current state 120b and subject to measurement noise 130b, to estimate a state 140b for the current iteration.

Due to the probabilistic nature of tracking, selection of the measurement noise 130b affects the update 135b. To that end, the selection of the measurement noise 130b affects the estimation of the state 140b, and thereby the correctness of the selection of the measurement noise 130b can be beneficial to the operation of the probabilistic filter.

Some embodiments are based on the realization that internal variables and/or calculations of the probabilistic filter, like a Kalman filter, can be used to evaluate correctness of the measurement noise 130b. Specifically, a metric of evaluation of the correctness of the measurement noise 130b can be a likelihood of the measurement noise 130b to correlate the current measurement indicative of the state of the device with the state predicted by the prediction model.

Figure 1D:
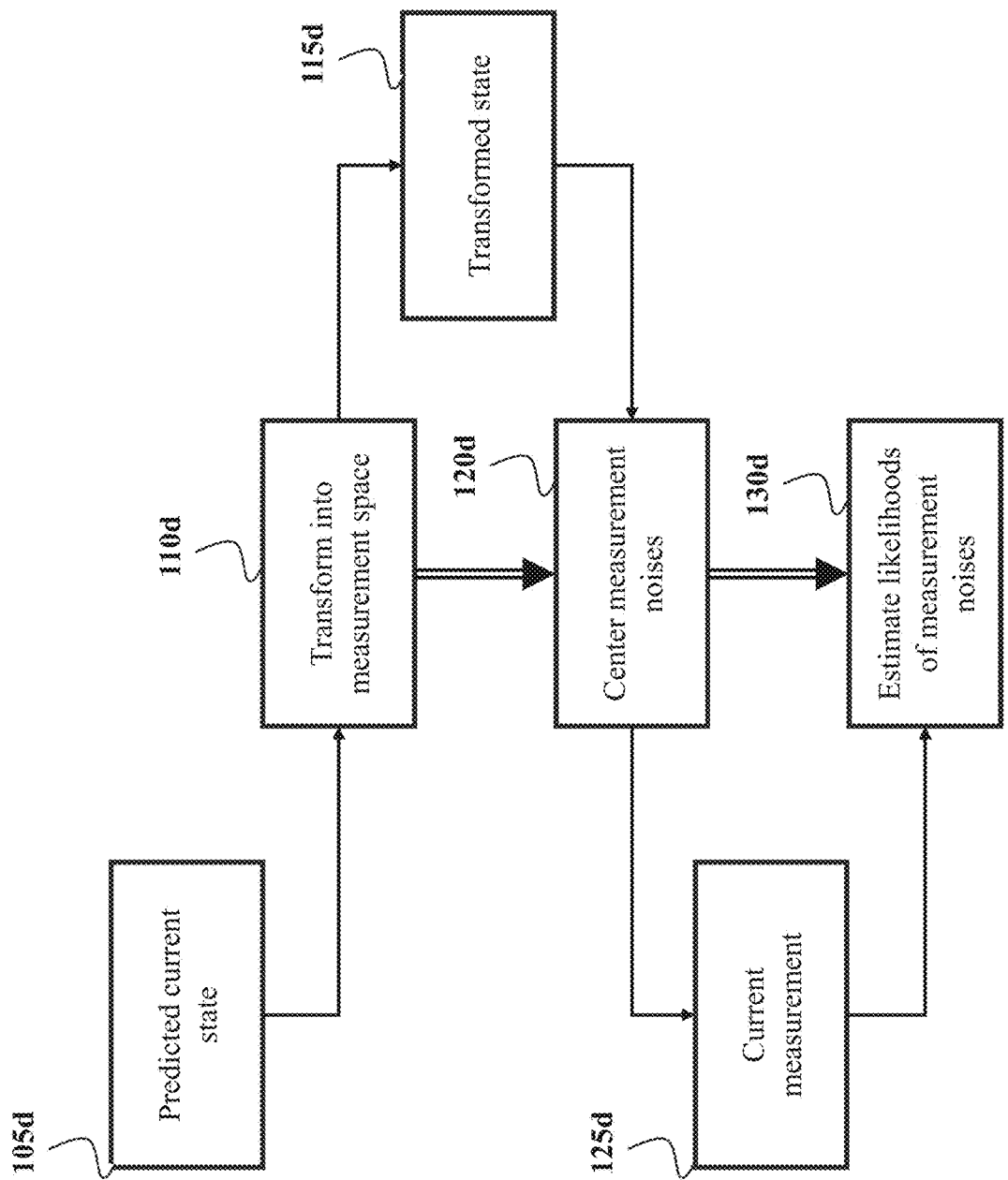
FIGS. 1D and 1E show an illustration of an exemplar evaluation of the correctness of measurement noise, according to some embodiments of the present disclosure.
Figure 1E:
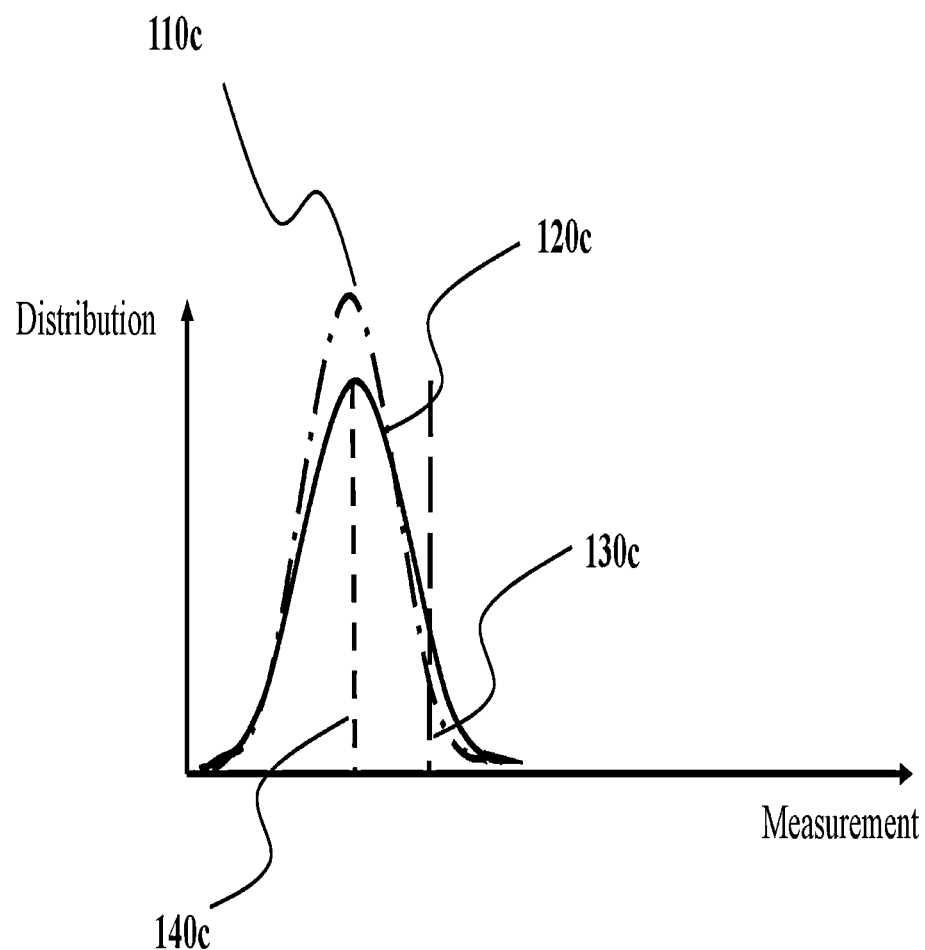

FIGS. 1D and 1E show illustrations of an exemplar evaluation of the correctness of the measurement noise according to some embodiments of the present disclosure. A predicted current state 105d of the controlled device, e.g., a predicted state of the vehicle, is transformed 110d into a domain of the measurements (i.e., measurement space) to obtain a transformed state 115d. An example of the transformed state is 140c shown in FIG. 1E. Such a transformation, for example, can be executed using a model of the measurements. Next, different measurement noise characteristics, e.g., noise covariances, are centered 120d on the transformed state 140c to estimate likelihoods of different measurement noises 110c and 120c shown in FIG. 1E. In an embodiment, each of the multiple probabilistic filters is a Kalman filter with the process noise and the measurement noise defined by corresponding Gaussian probabilistic distributions, such that the estimation of the predicted current state transformed into the measurement space is a mean of the Gaussian probabilistic distributions and different measurement noise covariances yield the Gaussian probabilistic distributions of the measurement noise.

Further, when a current measurement 125d for updating the predicted current state 105d is received, the measurements can be mapped 130c on probabilistic distributions to estimate the sought likelihood of the correlation. For example, as can be seen in FIG. 1E, the likelihood of the measurement noise 120c is greater than the likelihood of the measurement noise 110c at the mapped measurement 130c.

To that end, the compound probabilistic filter 104a executes multiple probabilistic filters 121a, 122a, and 123a having different measurement noises causing variations in the multiple estimates of the state of the device, e.g., the states 131a, 132a, and 133a. Next, the compound probabilistic filter 104a estimates, for each of the multiple probabilistic filters, a likelihood of corresponding measurement noise to correlate the current measurement with the predicted current state and combines 150a the multiple estimates of the state of the device into a weighted combination with normalized weights 141a, 142a, and 143a derived from the likelihoods estimated for corresponding probabilistic filters. Hence, the state of the device tracked by the compound probabilistic filter 104a for the current control step is based on the weighted combination 150a.

In such a manner, the measurement noise is evaluated using internal variables and/or calculations of the probabilistic filter without a need for additional statistical analysis of the measurements outside of performance of the probabilistic filter. It should be noted that the abovementioned example not only illustrates the principles of correlation between state estimation and the measurements but can also be used to implement the estimation of the correlation. However, different embodiments can use different techniques to evaluate the correlation. For example, some embodiments use the evaluation of Kalman gains determined by the Kalman filter to update the predicted current state and covariance of the state estimate, which for an unbiased estimator is the mean-square error (MSE). For instance, one embodiment determines the Kalman gain for each Kalman filter in the compound probabilistic filter, determines the updated predicted current state and the updated covariance of the state estimate using the Kalman gain, and determines a likelihood of the measurement noise based on the updated state and covariance based on the Kalman gain. Such calculations are internal to the probabilistic filters, i.e., computed anyway to track the state of the device. Hence, calculations of these variables do not require additional resources.

However, some embodiments are based on the realization that while the usage of the internal variables and/or calculations of the probabilistic filter can reduce the computational requirements for the evaluation of the correctness of the measurement noise, the evaluation itself becomes corrupted by internal performance of the probabilistic filter. In other words, the correctness of the measurement noise is not necessarily the true correctness reflecting the measurements independent of the probabilistic filter, but the correctness from the point of view of the probabilistic filter itself. To that end, it may be problematic to use this evaluation to adapt the measurement noise, but rather to use this evaluation to evaluate the performance of the probabilistic filter with the selected measurement noise.

To address this problem, some embodiments use multiple probabilistic filters with different measurement noises and determine the state of the device as a weighted combination of the states estimated by the multiple probabilistic filters 121a-123a with weights of each filter derived from the corresponding evaluation of the likelihood of the measurement noise to correlate the current measurement indicative of the state of the device with the state predicted by the prediction model of the filter. In such a manner, different measurement noises can be considered without a need to analyze the statistical properties of the measurements.

Figure 1F:
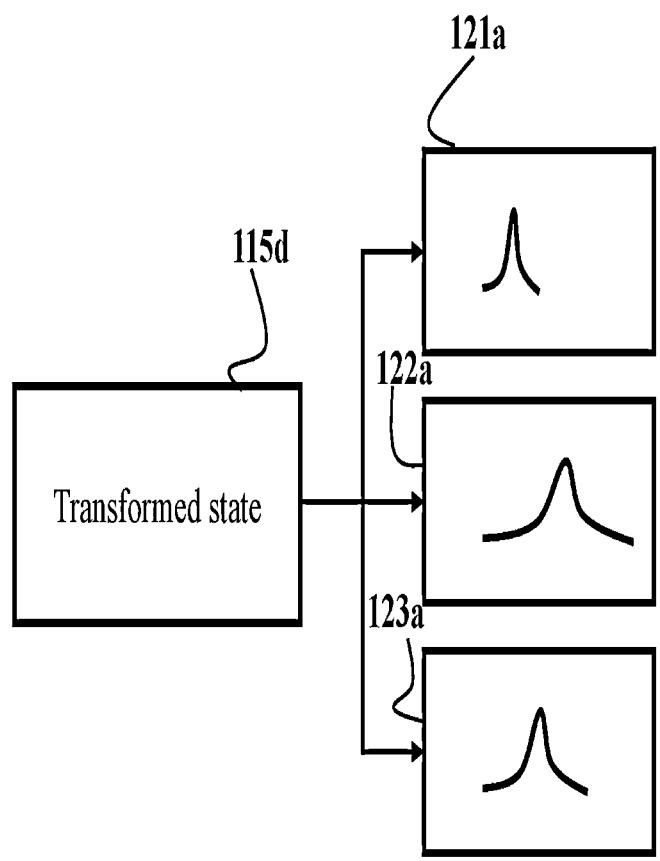
FIG. 1F illustrates a schematic for initialization of multiple probabilistic filters, according to some embodiments of the present disclosure.

In some embodiments, at each time step, each of the multiple probabilistic filters 121a-123a, is initialized based on the weighted combination 125a. For example, referring to FIG. 1F, in one embodiment, the transformed state 140c is used to initialize each of the multiple probabilistic filters 121a-123a and the predicted state of the probabilistic filter is updated differently by virtue of having different measurement noise covariances internally in each probabilistic filter. To that end, the estimation of the predicted current state transformed into the measurement space (i.e., transformed state 140c) is common for the multiple probabilistic filters 121a-123a.

Figure 1G:
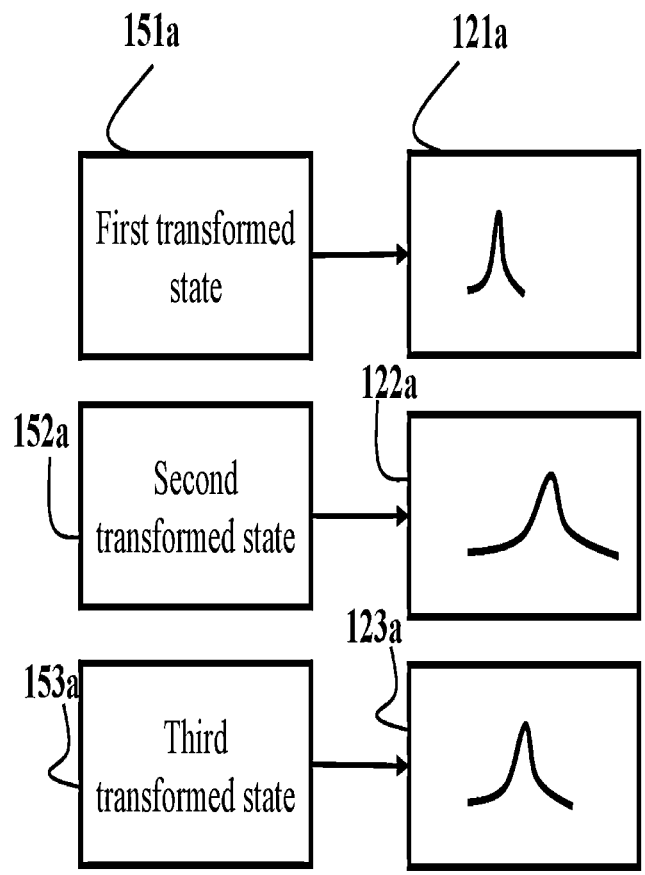
FIG. 1G illustrates a schematic for initialization of the multiple probabilistic filters, according to some other embodiments of the present disclosure.

In some other embodiments, the multiple probabilistic filters 121a-123a run in parallel using internal state estimates, wherein the weighted combination 125a is only used as an output of the compound probabilistic filter 104a. For example, referring to FIG. 1G, a first transformed state 151a is obtained for the probabilistic filter 121a by transforming the predicted current state of the probabilistic filter 121a into the measurement space. A second transformed state 152a is obtained for the probabilistic filter 122a by transforming the predicted current state of the probabilistic filter 122a into the measurement space. A third transformed state 153a is obtained for the probabilistic filter 123a by transforming the predicted current state of the probabilistic filter 123c into the measurement space. The multiple probabilistic filters 121a-123a update their internal state estimate using the first transformed state 151a, the second transformed state 152a, and the third transformed state 153a, respectively, in the next iteration. In other words, the estimation of the predicted current state transformed into the measurement space is different for different probabilistic filters.

Some embodiments are based on the recognition that when having the same transformed state estimate initializing each probabilistic filter at each time step of control may cause a lack of diversity in the state estimates, because each probabilistic filter has only one time step to diversify. Some other embodiments are based on the understanding that, to have the multiple probabilistic filters 121a-123a run independently from each other, can cause depletion, meaning that after a few time steps only one of the multiple probabilistic filters 121a-123a may have nonzero weight.

To resolve the aforementioned issues, some embodiments initialize the state estimates together at each time step of control by mixing of the estimates, where the mixing for each probabilistic filter is determined by the weights 141a, 142a, and 143a, and a relation to the other weights.

Some embodiments are based on realization that the compound probabilistic filter framework described in FIG. 1B can be applied for measurements of a Global Navigation Satellite System (GNSS). For instance, the compound probabilistic filter 104a may be configured to track the state of the vehicle at the different control steps using the GNSS measurements to produce a sequence of states of the vehicle corresponding to the GNSS measurements.

Figure 2A:
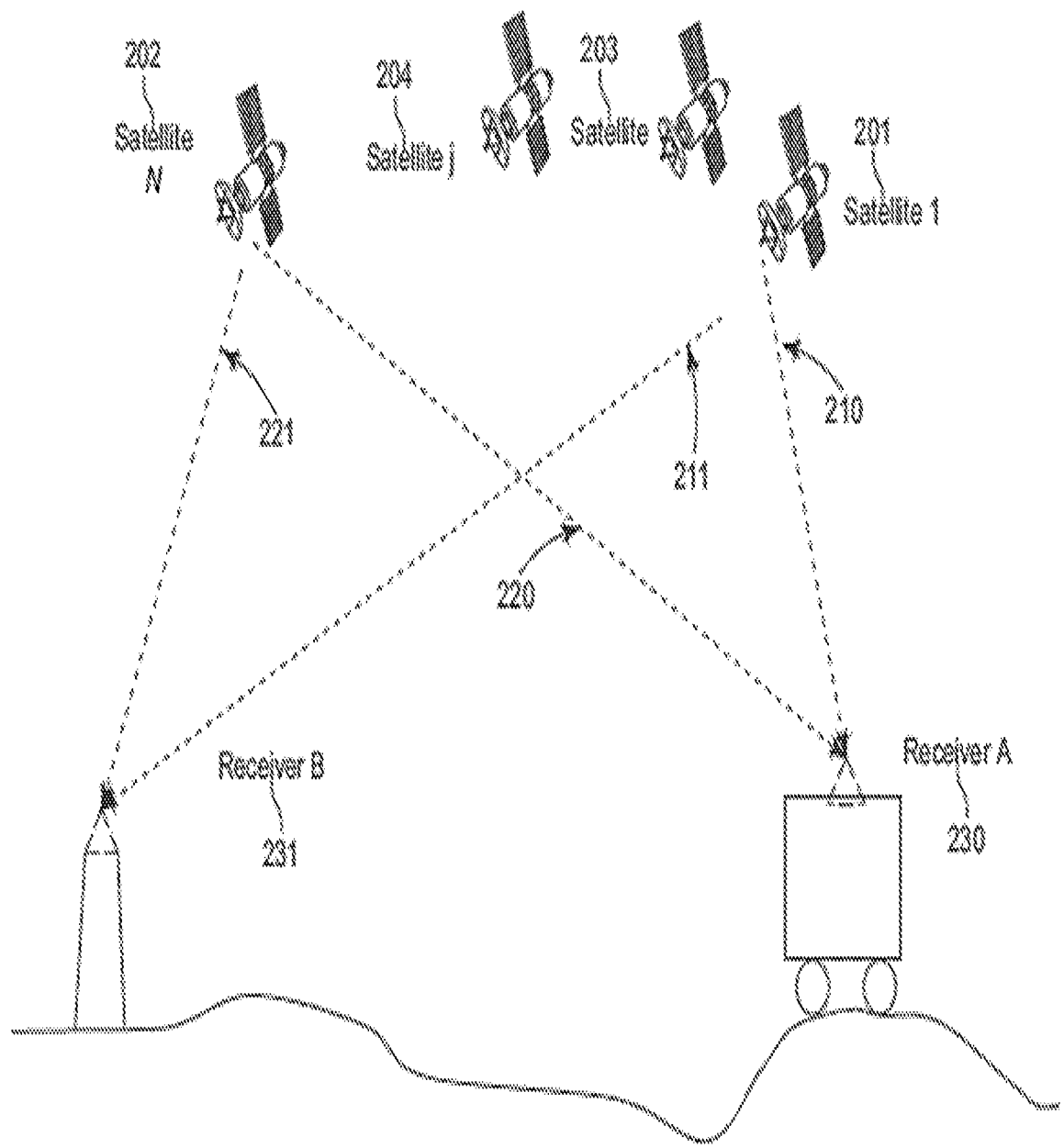
FIG. 2A shows a schematic of a global navigation satellite system (GNSS) system, according to some embodiments of the present disclosure.

A GNSS is a system of satellites that can be used for determining a geographic location of a mobile receiver with respect to earth. The GNSS may include GPS, Galileo, Glonass, QZSS, and BeiDou. An example of the GNSS is explained in detail in FIG. 2A. FIG. 2A shows a schematic of the GNSS, according to some embodiments. For instance, Nth satellite 202 transmits 220 and 221 code and carrier phase measurements to a set of receivers 230 and 231. For example, the receiver 230 is positioned to receive signals 210, 220, from N satellites 201, 203, 204, and 202. Similarly, the receiver 231 is positioned to receive signal 221 and 211 from the N satellites 201, 203, 204, and 202.

In various embodiments, the GNSS receiver 230 and 231 can be of different types. For example, in the exemplar embodiment of FIG. 2A, the receiver 231 is a base receiver, whose position is known. For instance, the receiver 231 can be a receiver mounted on the ground. In contrast, the receiver 230 is a mobile receiver configured to move. For instance, the receiver 230 is mounted in a vehicle. In some implementations, the second receiver 231 is optional and can be used to remove, or at least decrease, uncertainties and errors due to various sources, such as atmospheric effects and errors in internal clocks of the receivers and satellites. In some embodiments, there are multiple GNSS receivers receiving code and carrier phase signals.

It is an objective of some embodiments to disclose a system and method for improving the satellite-based tracking of a state of the vehicle, wherein the vehicle is equipped with a GNSS receiver. It is another objective to provide such a system and method using unsynchronized cooperation of information received from satellite signals. It is yet another objective of some embodiments to provide such a system and method that is probabilistic, i.e., it accounts for probabilistic disturbances and error sources. It is an objective of other embodiments to track the state of a vehicle using different information from different sources, and not only rely on satellite signals. For example, in some embodiments the state of the vehicle is tracked using GNSS signals received from satellites using a GNSS receiver and a first and second moment of the probabilistic distribution of the state of the vehicle received from a remote server using a radio frequency (RF) receiver.

In certain scenarios, e.g., deep urban canyons, there are multiple distortions of satellite signals such that the information content in the code and carrier phase signals makes it difficult to perform high-precision state estimation. For instance, FIG. 2B shows an illustration of a scenario where multipath disturbs the signals for the receiver 201b. The receiver 201b receives various signals 209b and 219b from satellites 210b and 220b. There are other satellites 230b and 240b that transmits signals 228b, 229b, 238b, 239b, but due to obstructions 270b and 280b, for instance, buildings in urban areas, these signals are not directly transmitted to the receiver.

Previously, the signal 238b sent from the satellite 240b was not available, but suddenly the satellite signal 239b reaches the receiver after a multipath 202b. This scenario is also observable in satellite signal 229b sent from satellite 230b, where the satellite signal 229b reaches the receiver after a multipath 203b. Such scenarios can severaly detriment the performance of the probabilistic filter in tracking the state of the vehicle, because the probabilstic filter locks on to the wrong ambiguity estimate, causing a large estimation error.

Additionally, some embodiments are based on the realization that to perform certain advanced driver-assistance systems (ADAS) tasks, such as adaptive cruise control or short-term lane changes, it is sufficient to know the relative position and velocity to other vehicles, which can be measured by, e.g., ultrasound, radar, or camera. However, in many applications surrounding more advanced ADAS and vehicles with autonomous driving (AD) capabilities, it is not enough to know the relative position to surrounding vehicles that can be measured directly, but it is also critical to know state information relative to objects not even visible at a given time step from the vehicle having the AD capabilities. For example, in a route planning or multi-agent motion planning and coordination task, a control problem to be solved is to optimally coordinate vehicles toward different goals, with varying road surface quality, each passenger of a given vehicle with different priorities, e.g., related to driver comfort and other performance metrics. To identify which timed path a particular vehicle should take depends on the location of the own vehicle, timed paths of the other vehicles, and the particular environment setting for the road of interest.

Some embodiments are based on the realization that while the camera can be used to detect the relative motion to the road and surrounding objects in immediate vicinity of the vehicle with AD capabilities, the camera cannot provide a global position of the vehicle. Also, while distance sensors such as radar, lidar, and ultrasound, can detect relative motion similar to the camera, it cannot be used as a sole sensor to position vehicles globally.

Further, some embodiments are based on the recognition that GNSSs are prone to various disturbances and occlusion, e.g., from tall buildings in urban canyons. Some embodiments therefore complement the GNSS with additional sensing. For example, GNSS combined with additional sensing such as camera and lidar, can accomplish global positioning, as well as relative to a map and other objects, because the GNSSs provide the global positioning, and the additional sensing provides the relative positioning. Thus, in several localization estimation methods a multitude of sensors are used together to achieve vehicle localization with an aim of improving performance relative to what a sensor alone can provide.

To this end, various methods fuse GNSS measurements and measurements of a plurality of sensors of different types indicative of the state of the device, to estimate the state of the vehicle. The plurality of sensors may include one or a combination of a camera, a radar, a lidar, and the like. Additionally or alternatively, the plurality of sensors may include one or a combination of a camera producing color images, a depth sensor producing depth images, and a roadside unit (RSU) producing fused measurements of multiple remote sensors.

Using the measurements of the plurality of sensors is beneficial. For example, different sensors can complement each other, e.g., GNSS is dependent on whether the environment is urban or rural but not weather dependent, whereas the camera is independent on whether the environment is rural or urban but is sensitive to weather conditions and quality of the road to detect lane markings.

Various estimation methods that fuse the measurements of the plurality of sensors assume that the measurement noise of such sensors is determined a priori. However, in practice the measurement noise is time varying because it varies with driving conditions, the environment, and filtering and computer vision algorithms that generated such sensor measurements. For instance, a camera is used together with a computer vision algorithm to generate lane marking measurements of lanes neighboring the lane the vehicle is driving in. Depending on the weather conditions, the road quality, and the specific computer vision algorithm used, the lane markings are sometimes accurately detected, sometimes detected with an error, and sometimes other parts of the road, e.g., cracks in the road, are detected as lane markings. Depending on such detection results, the characteristics of the measurement noise will vary accordingly.

Accordingly, there is a need for tracking the state of the vehicle by fusing the measurements of the plurality of sensors while adapting to the varying measurement noises. According to some embodiments, the feedback controller 100 may be operatively connected to the plurality of sensors using wired, wireless, or both communication links, and thus the feedback controller 100 can collect measurements of the plurality of sensors indicative of the state of the device. Further, the measurement model of the multiple probabilistic filters 121a-123a of the compound probabilistic filter 104a fuses the measurements of the plurality of sensors to produce corresponding estimations of the state of the vehicle.

In the following part of the present disclosure, a method for estimating the state of the vehicle using the GNSS measurements and controlling the vehicle based on the estimated state, is described. Next, a method for estimating the state of the vehicle using the measurements of the plurality of sensors, is described.

Figure 3A:
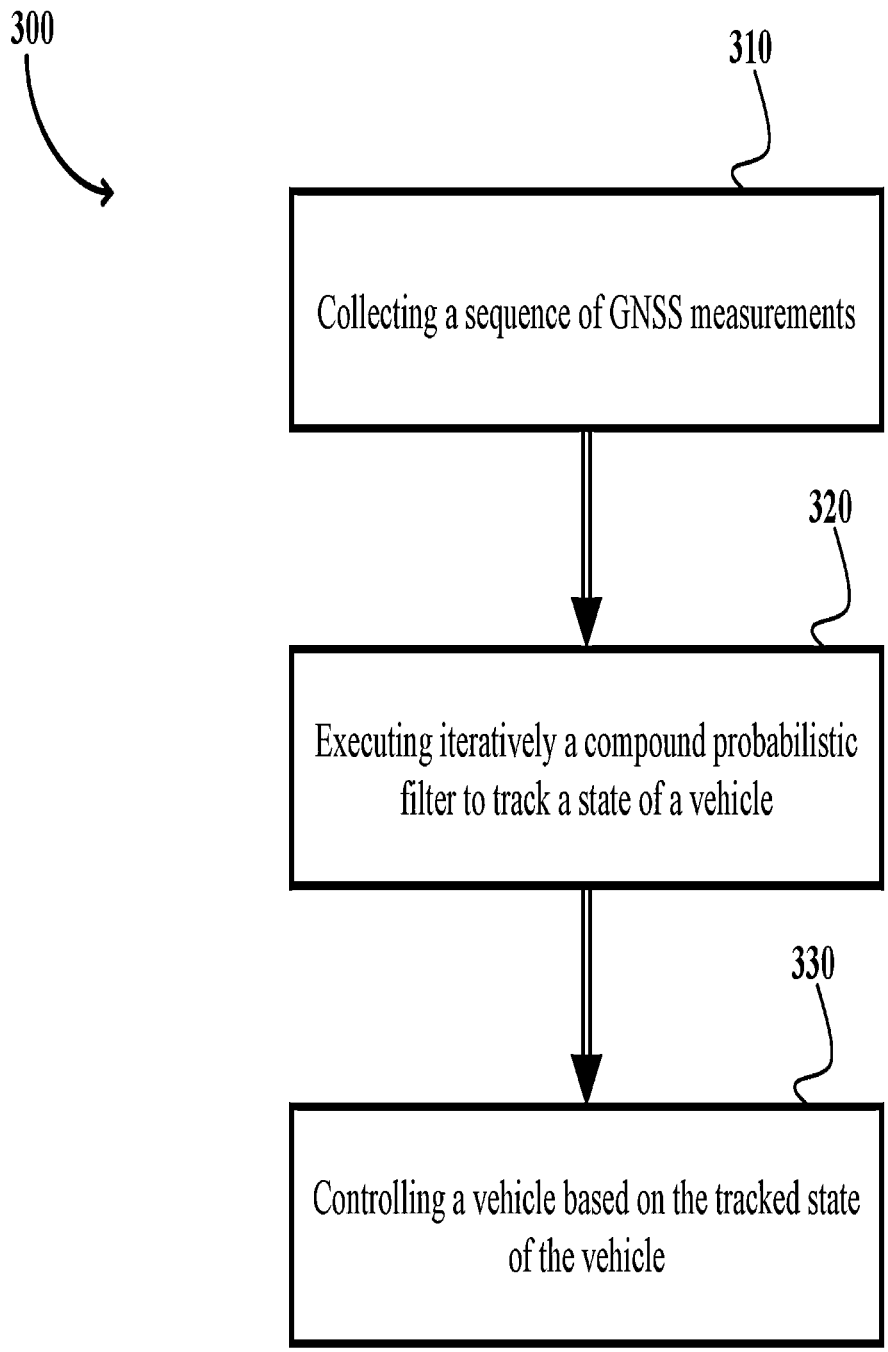
FIG. 3A shows a block diagram of a method for estimating a state of a vehicle using GNSS measurements and controlling the vehicle based on the estimated state, according to some embodiments of the present disclosure.

FIG. 3A shows a block diagram of a method 300 for estimating the state of the vehicle using the GNSS measurements and controlling the vehicle based on the estimated state, according to some embodiments of the present disclosure. As used herein, the vehicle can be any type of moving entity, such as a passenger car, a tractor-trailer, a bus, a drone, or a mobile robot. In some embodiments, the method 300 uses the compound probabilistic filter 104a parametrized on the state of the vehicle. At block 310, the method 300 includes collecting a sequence of GNSS measurements indicative of the state of the vehicle at different control steps. At block 320 the method 300 includes executing iteratively the compound probabilistic filter 104a configured to track the state of the vehicle at the different control steps using the sequence of GNSS measurements to produce a sequence of states of the vehicle corresponding to the sequence of GNSS measurements. At block 330, the method 300 includes control the vehicle based on the tracked state of the vehicle.

Figure 3B:
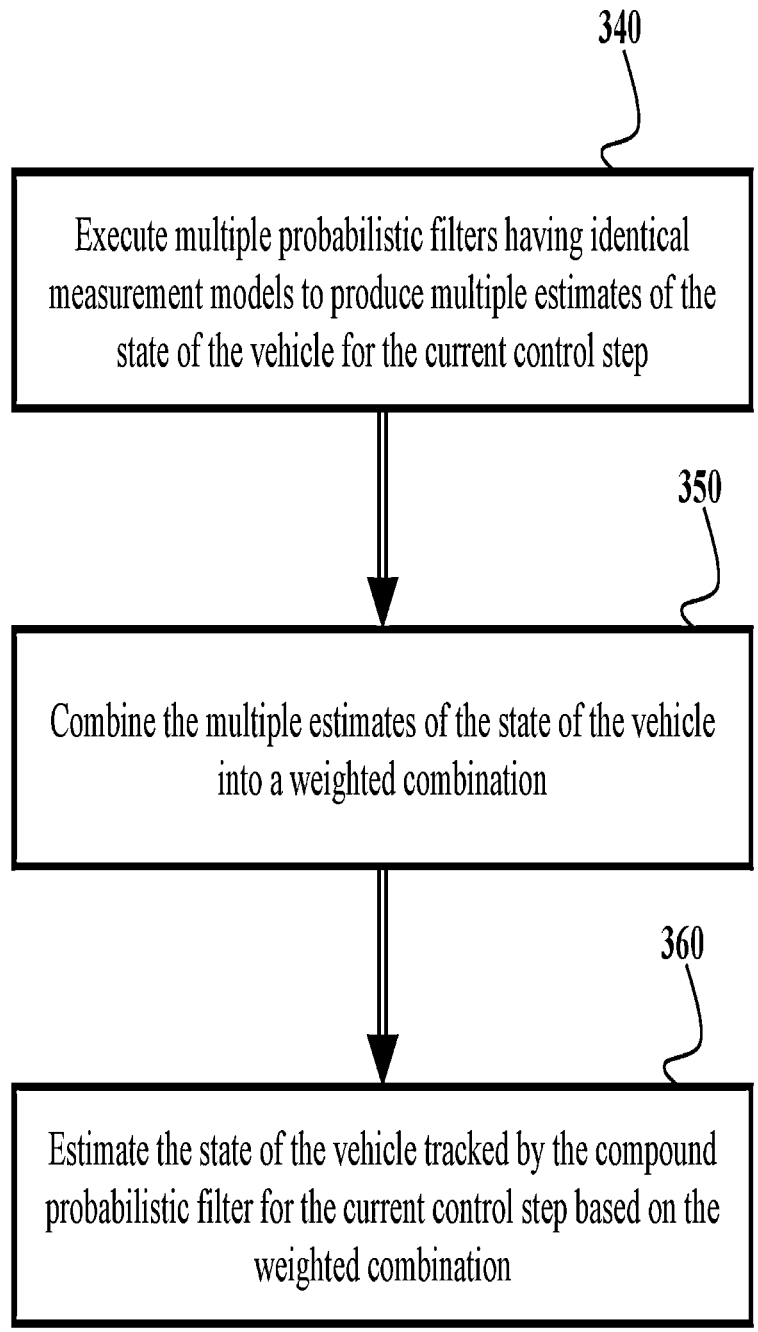
FIG. 3B shows a block diagram of functions executed by a compound probabilistic filter for an iteration, according to some embodiments of the present disclosure.

To perform an iteration for a current control step using a current GNSS measurement, the compound probabilistic filter 104a executes the functions described in FIG. 3B.

FIG. 3B shows a block diagram of functions executed by the compound probabilistic filter 104a in an iteration, according to some embodiments of the present disclosure. At block 340, the compound probabilistic filter 104a executes multiple probabilistic filters having identical measurement models relating the current GNSS measurement with a current estimation of the state of the vehicle to produce multiple estimates of the state of the vehicle for the current control step. The multiple probabilistic filters are subject to different measurement noises causing variations among the multiple estimates of the state of the vehicle. In some implementations, the multiple probabilistic filters include a first probabilistic filter configured to produce a first estimate of the state of the vehicle subject to a first measurement noise defined by a first probability density function (PDF) and a second probabilistic filter configured to produce a second estimate of the state of the vehicle subject to a second measurement noise defined by a second PDF different from the first PDF.

At block 350, the compound probabilistic filter 104a combines the multiple estimates of the state of the vehicle into a weighted combination with weights derived from likelihoods of the current GNSS measurement according to different measurement noises centered on an estimation of the current GNSS measurement predicted by one or a combination of the multiple probabilistic filters. At block 360, the compound probabilistic filter 104a estimates the state of the vehicle tracked by the compound probabilistic filter 104a for the current control step based on the weighted combination.

Figure 3C:
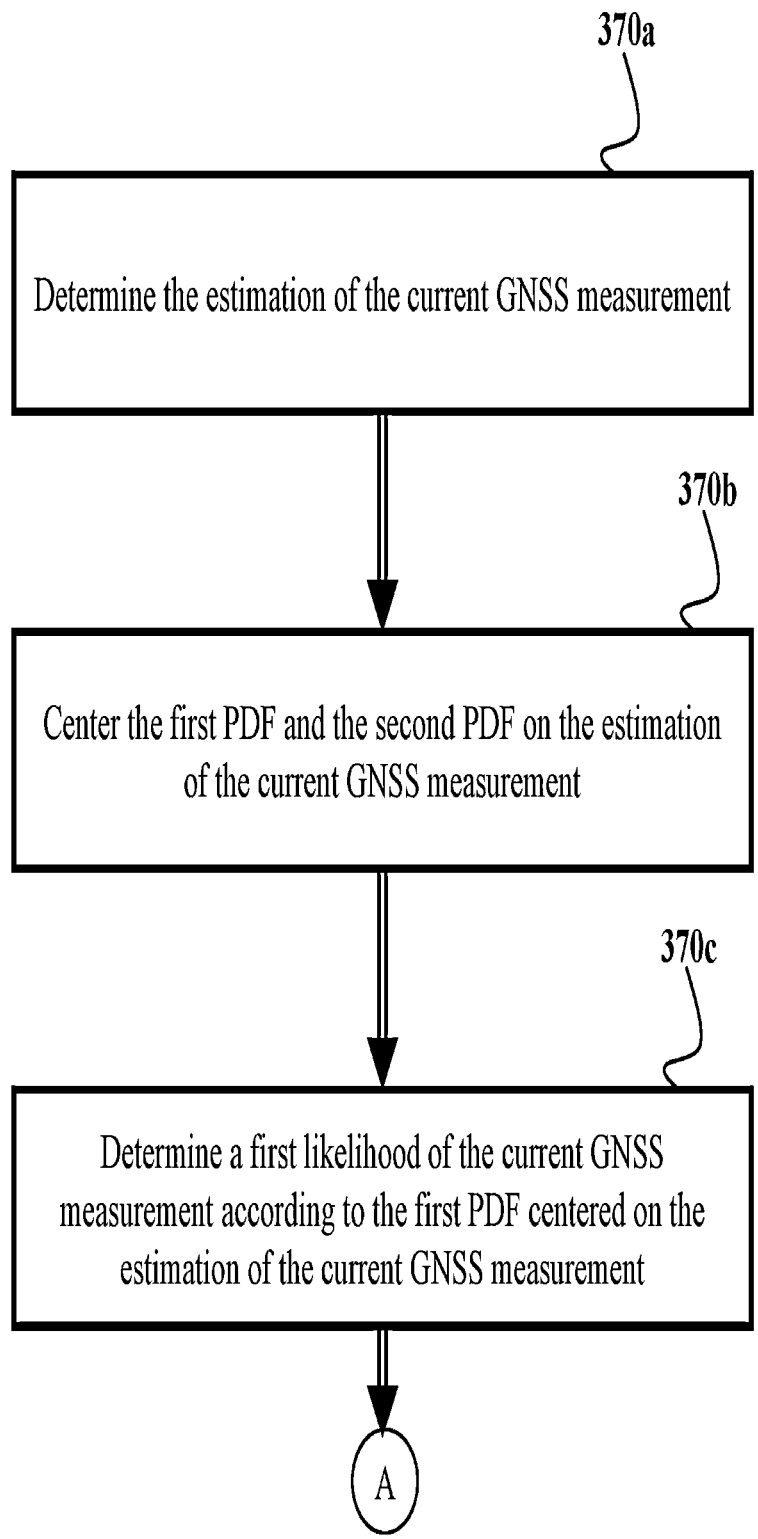
FIG. 3C shows a block diagram for producing a weighted combination of state estimates, according to some embodiments of the present disclosure.
Figure 3C:
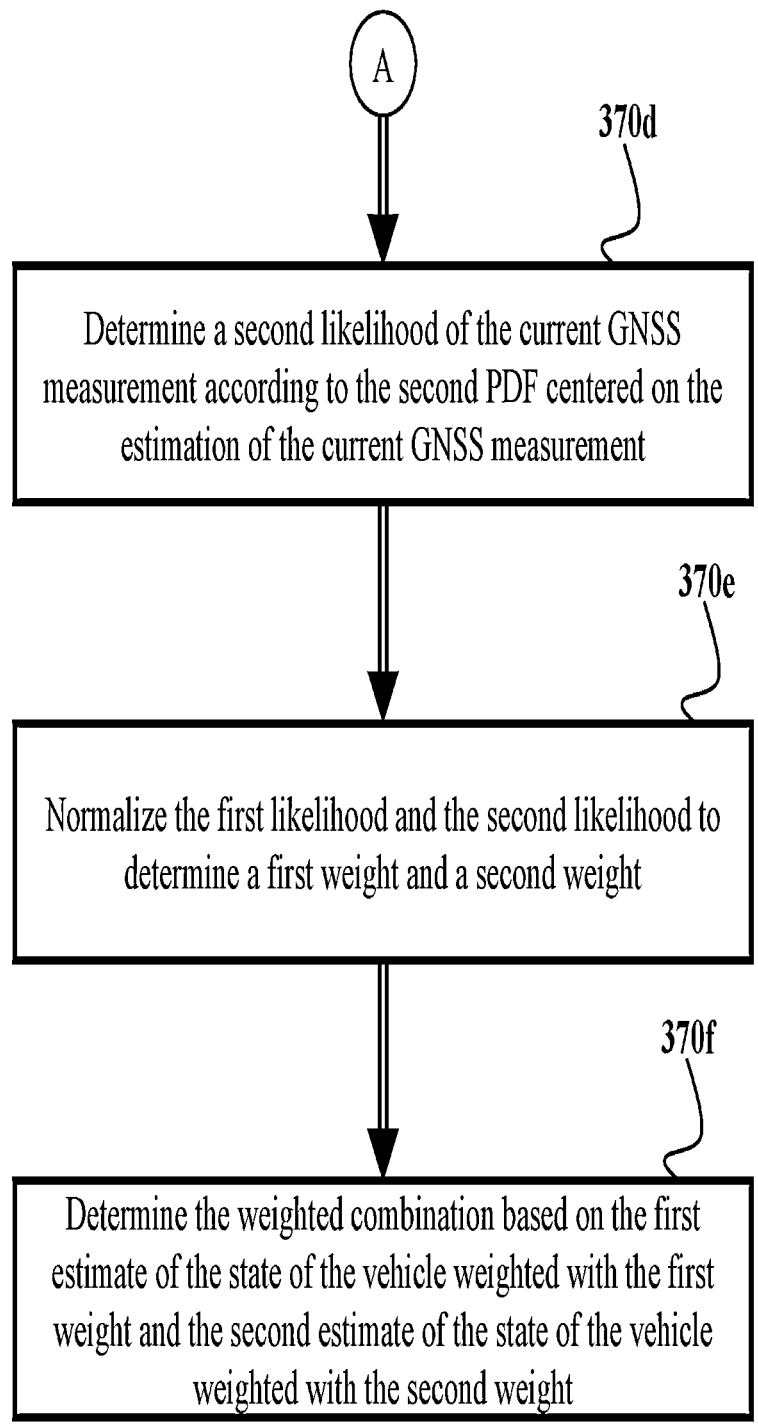

FIG. 3C shows a block diagram for producing the weighted combination 350, according to some embodiments of the present disclosure. At block 370a, the compound probabilistic filter 104a determines the estimation of the current GNSS measurement by transforming a prediction of the current state of the vehicle from a state space to a measurement space. At block 370b, the compound probabilistic filter 104a centers the first PDF and the second PDF on the estimation of the current GNSS measurement.

At block 370c, the compound probabilistic filter 104a determines a first likelihood of the current GNSS measurement according to the first PDF centered on the estimation of the current GNSS measurement. At block 370d, the compound probabilistic filter 104a determines a second likelihood of the current GNSS measurement according to the second PDF centered on the estimation of the current GNSS measurement. At block 370e, the compound probabilistic filter 104a normalizes the first likelihood and the second likelihood to determine a first weight for weighting the first estimate of the state of the vehicle and a second weight for weighting the second estimate of the state of the vehicle.

At block 370f, the compound probabilistic filter 104a determines the weighted combination based on the first estimate of the state of the vehicle weighted with the first weight and the second estimate of the state of the vehicle weighted with the second weight.

Figure 3D:
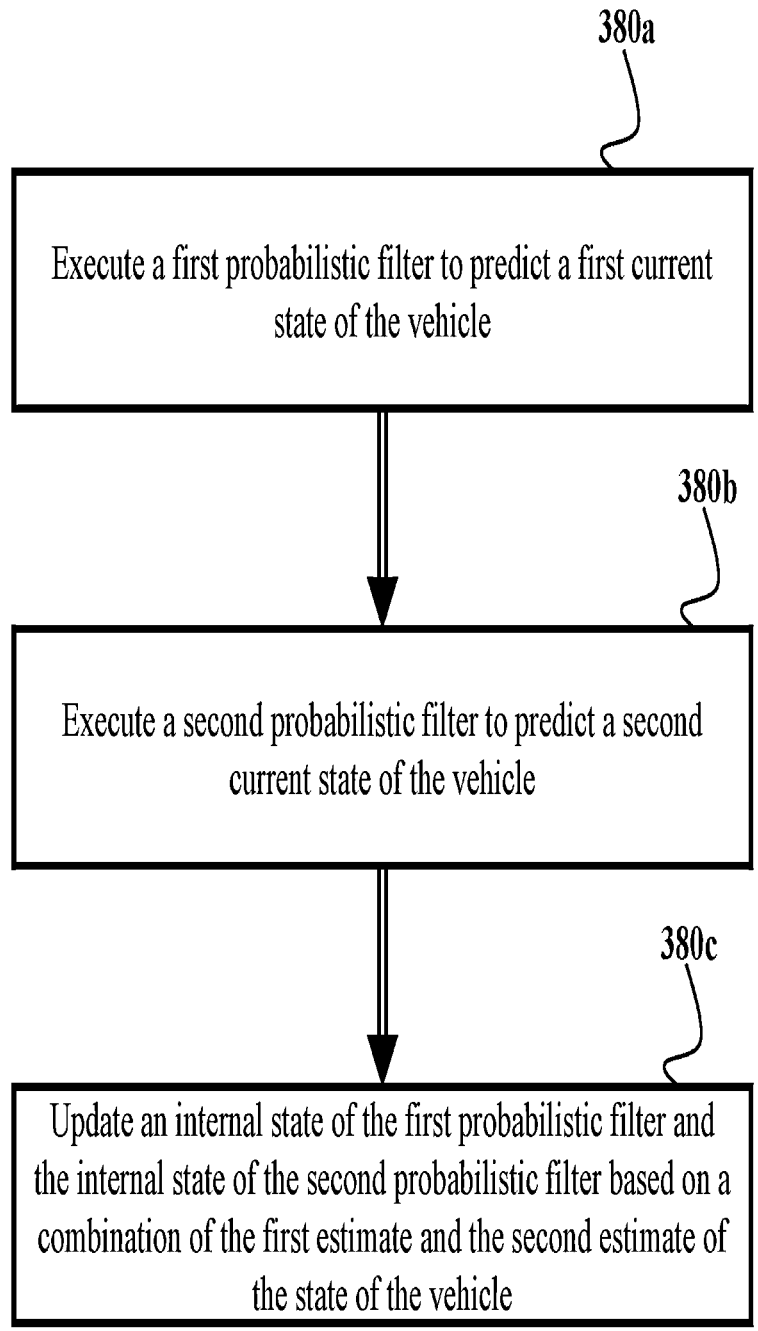
FIG. 3D shows a block diagram for producing the weighted combination, according to an alternate embodiment of the present disclosure.

FIG. 3D shows a block diagram for producing the weighted combination 350, according to an alternate embodiment of the present disclosure. At block 380a, the compound probabilistic filter 104a executes the first probabilistic filter to predict a first current state of the vehicle based on an internal state of the first probabilistic filter and updates the first current state of the vehicle. The first current state of the vehicle is updated using the measurement model processing the current GNSS measurement according to a gain of the first probabilistic filter to produce the first estimate of the state of the vehicle.

At block 380b, the compound probabilistic filter 104a executes the second probabilistic filter to predict a second current state of the vehicle based on an internal state of the second probabilistic filter and updates the second current state of the vehicle. The second current state of the vehicle is updated using the measurement model processing the current GNSS measurement according to a gain of the second probabilistic filter to produce the second estimate of the state of the vehicle.

At block 380c, the compound probabilistic filter 104a updates the internal state of the first probabilistic filter and the internal state of the second probabilistic filter based on a combination of the first estimate and the second estimate of the state of the vehicle produced by the first probabilistic filter and the second probabilistic filter.

In some embodiments, the compound probabilistic filter stores historic weights of the first probabilistic filter and the second probabilistic filter determined for a number of previous control steps. Further, the compound probabilistic filter 104a updates the weight for weighting the first probabilistic filter at the current control step based on an average of a current weight (e.g., the first weight) and the historic weights of the first probabilistic filter. Likewise, the compound probabilistic filter 104a updates the weight for weighting the second probabilistic filter at the current control step based on an average of a current weight (e.g., the second weight) and the historic weights of the second probabilistic filter.

Figure 3E:
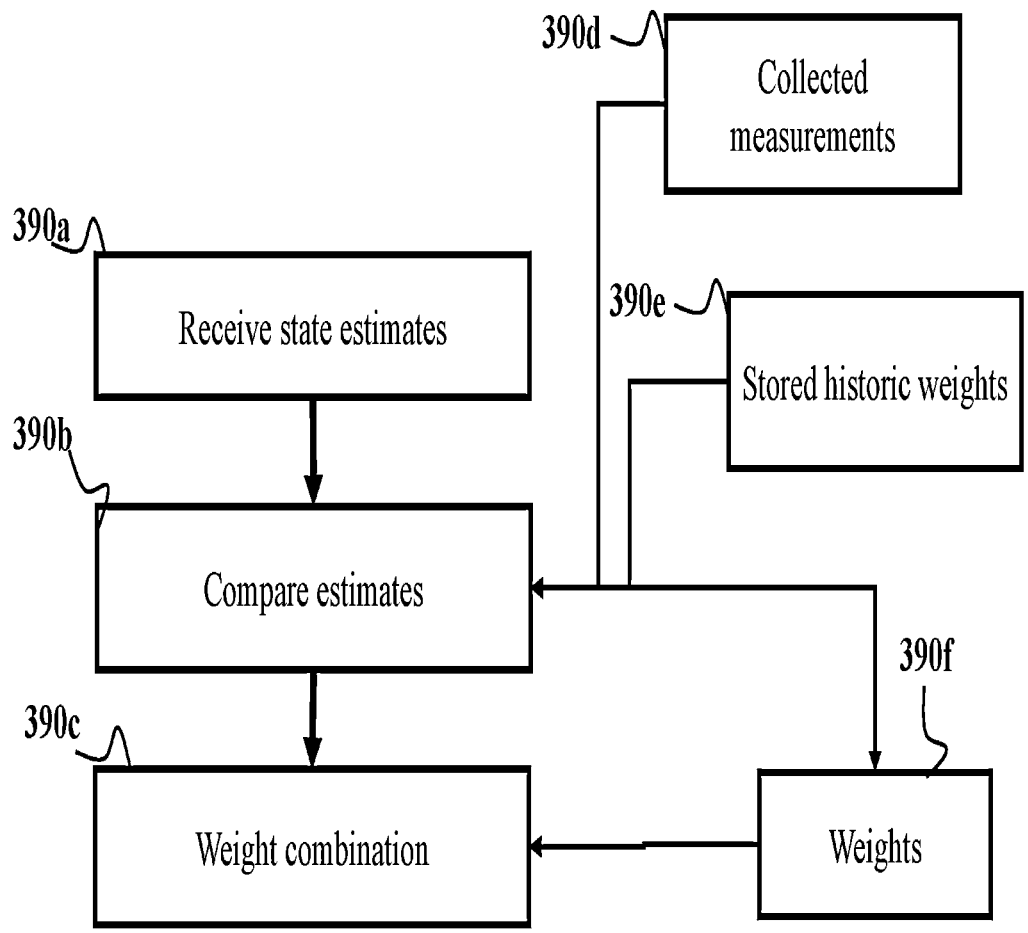
FIG. 3E shows a schematic for determining the weighted combination using stored historic weights, according to some embodiments of the present disclosure.

FIG. 3E shows a schematic for determining the weighted combination using stored historic weights, according to some embodiments of the present disclosure. At block 390a, state estimates determined by each probabilistic filter are received. Next, at block 390b, using collected measurements 390d, stored historic weights 390e and hypothesis of noise covariances are compared to determine weights 390f. At block 390c, based on the determined weights 390f, the state estimates are combined as a weighted combination. The historic weights may be stored in the memory 104 of the feedback controller 100. In an alternate embodiment, the historic weights may be stored in an external memory and the feedback controller 100 retrieves the historic weights from the external memory.

Comparing the state estimates and determining the weights 390f can be carried out in several ways. For instance, in one embodiment, the weight for each probabilistic filter is determined by a combination of the stored historic weights and a weighted difference of the collected measurements and the received state estimate when inserting the state estimate into the measurement model having the associated hypothesis of noise covariance. In another embodiment, the weight for each probabilistic filter is determined uniquely by a weighted difference of the collected measurements and the received state estimate when inserting the state estimate into the measurement model having the associated hypothesis of noise covariance. In yet another embodiment, the weight is determined based on an average of a current weighted difference of the collected measurements and the received state estimate when inserting the state estimate into the measurement model having the associated hypothesis of noise covariance and the weights determined using a fixed number of previous time steps. For example, one embodiment determines the weight as a moving average using a sliding window of weights determined using previous time steps. Doing in such a manner provides a means to control variation of the weights over consecutive time steps to ensure smooth estimation performance.

Figure 4A:
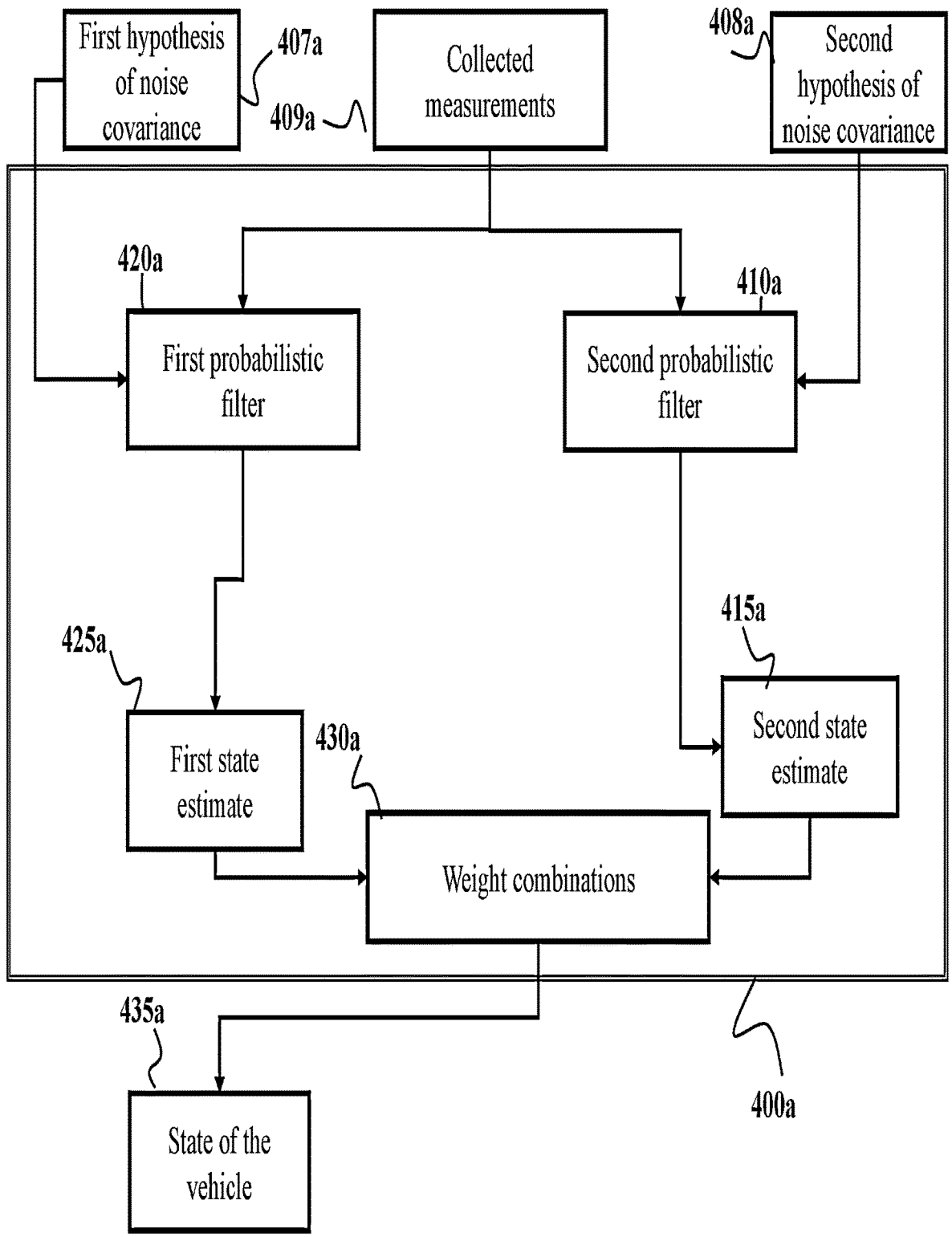
FIG. 4A shows a schematic for estimating the state of the vehicle using measurements of a plurality of sensors, according to some embodiments of the present disclosure.

FIG. 4A shows a schematic for estimating the state of the vehicle using the measurements of the plurality of sensors, according to some embodiments of the present disclosure. In some embodiments, a compound probabilistic filter 400a parametrized on the state of the vehicle is used to estimate the state of the vehicle. The compound probabilistic filter 400a estimates the state of the vehicle based on collected measurements 409a. For example, the collected measurements 409a include first measurements from a first sensor and second measurements from a second sensor.

The compound probabilistic filter 400a includes multiple probabilistic filters. For example, the compound probabilistic filter 400a includes a first probabilistic filter 420a and a second probabilistic filter 410a. The first probabilistic filter 420a determines a first state estimate 425a using a first hypothesis of noise covariance 407a of the first measurements and a first hypothesis of noise covariance 407a of the second measurements. Similarly, the second probabilistic filter 410a determines a second state estimate 415a using a second hypothesis of noise covariance 408a of the first measurements and a second hypothesis of noise covariance 408a of the second measurements. In an embodiment, the first hypothesis of the noise covariance of the first measurements is different from the second hypothesis of noise covariance of the first measurements, and the first hypothesis of noise covariance of the second measurements is different from the second hypothesis of noise covariance of the second measurements, or both. In such a case, the first and second noise distributions of either measurement are different distributions in terms of its parameters but represent the same entity. For instance, both distributions represent the measurements of a camera but have different noise values.

Next, using the first state estimate 425a of the first probabilistic filter 420a and the second state estimate 415a from the second probabilistic filter 410a, a state of the vehicle 435a is determined as a weighted combination 430a, wherein the weighting 430a of the combinations is determined online, offline, or as a combination thereof. In one embodiment, the state of the vehicle 435a is a weighted mean of the first probabilistic filter 420a and the second probabilistic filter 410a. In another embodiment, the state of the vehicle 435a is the output of the probabilistic filter having the highest weight.

In one embodiment, each probabilistic filter is a linear regression Kalman filter that estimates a mean and a covariance of the vehicle state. In another embodiment, the probabilistic filter is a particle filer, which outputs a sampled representation of a posterior distribution. Some embodiments employ a probabilistic filter including various variants of Kalman filter (KF), e.g., extended KFs (EKFs), linear-regression KFs (LRKFs), such as the unscented KF (UKF).

Some embodiments are based on the understanding that if a probabilistic filter using a particular combination of measurement noise values for various sensors gave the best fit at a previous time step, it is likely to also produce a good fit for the next time step. For example, if a GNSS measurement was unreliable in a previous time step due to, e.g., multipath in an urban environment, it is likely to be prone to multipath also in the next time step. However, it also has a chance of producing a reliable measurement if the unreliability of the measurement is not an effect of multipath but due to some other unmodeled disturbance. Some embodiments use this understanding to integrate and weight the multiple probabilistic filters at each time step of control such that the probabilistic filters are given different weightings based on their weights at previous time steps.

Some embodiments are based on the understanding that the computational complexity of the multiple probabilistic filters grows unfavorably with a number of hypotheses of noise values and the number of sensors. For instance, one embodiment understands that using different possible noise values can be interpreted as gridding of a continuous space of possible noise values such that there is an exponential complexity in the number of possible combinations of noise values and therefore the number of probabilistic filters employed in the estimation.

Some embodiments realize that in automotive applications the computational power of automotive-grade electronic control units is limited and using a large number of probabilistic filters is not computationally feasible. One embodiment remedies this by selecting a subset of the probabilistic filters to be used in the estimation. For instance, one embodiment selects probabilistic filters corresponding to values of measurement noises close to those that were well represented the state at the previous time step. Doing in such a manner enables the subset of probabilistic filters chosen at each time step to follow evolution of the sensor quality.

Figure 4B:
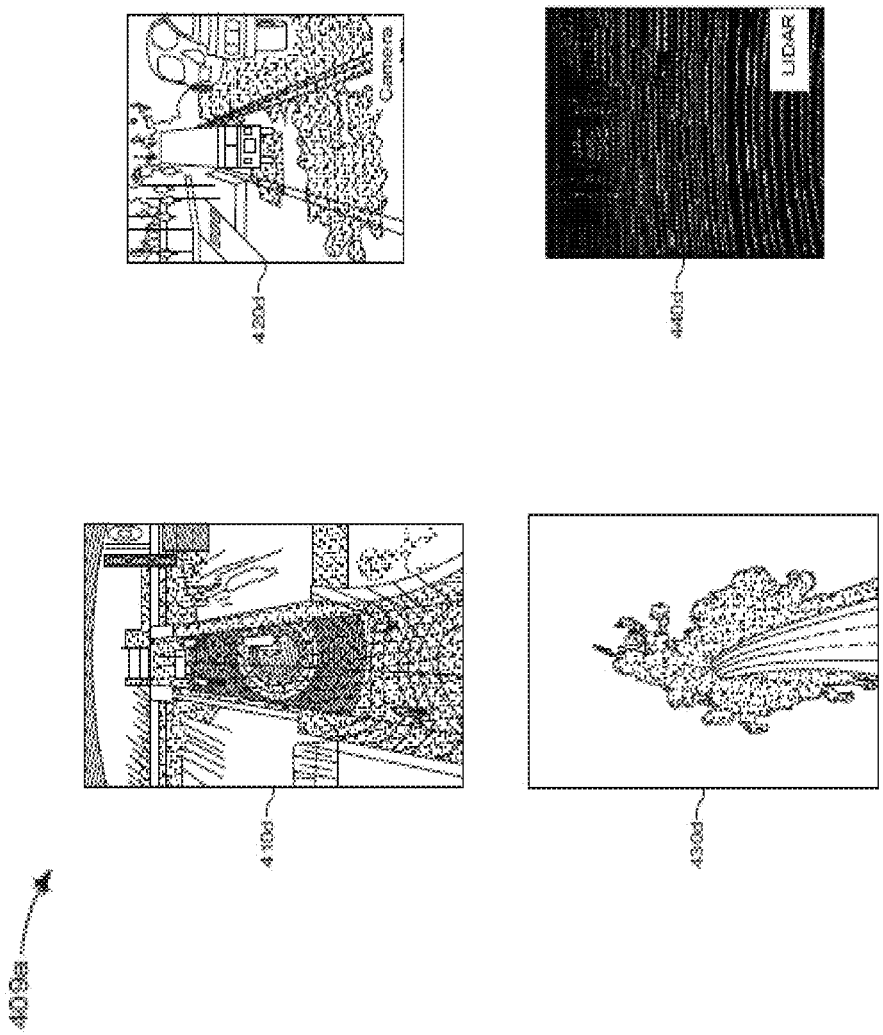
FIG. 4B shows an illustration of different sensor measurements collected, according to various embodiments of the present disclosure.
Figure 4B:
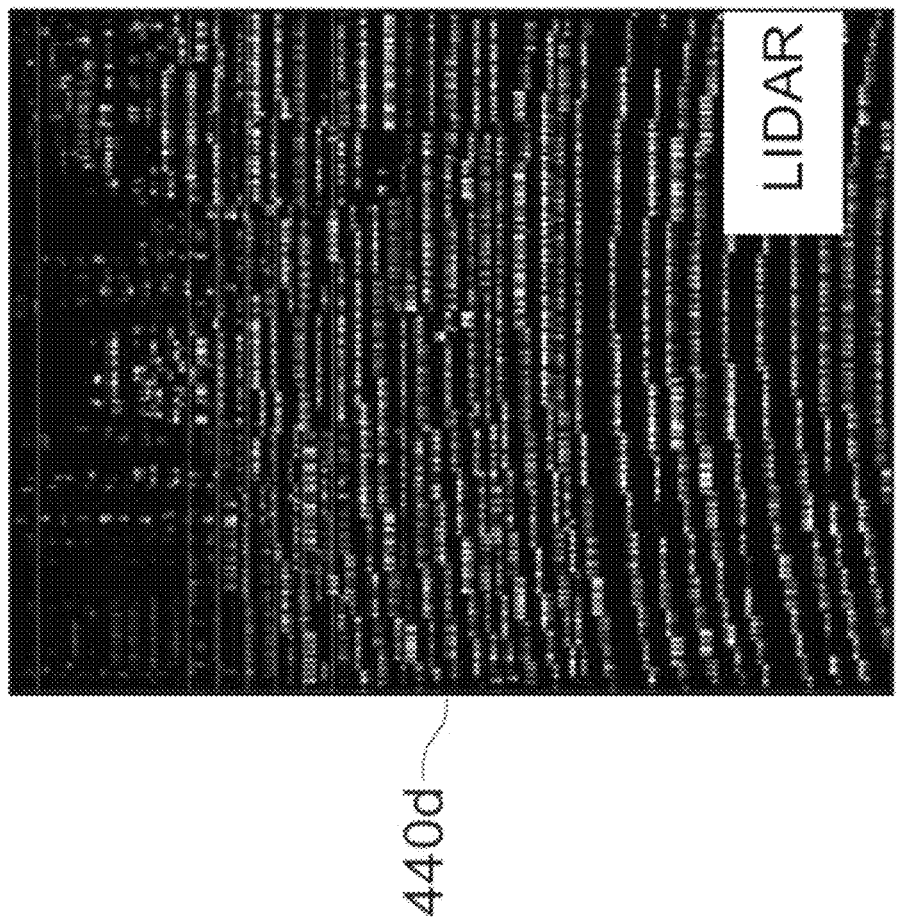
Figure 4B:
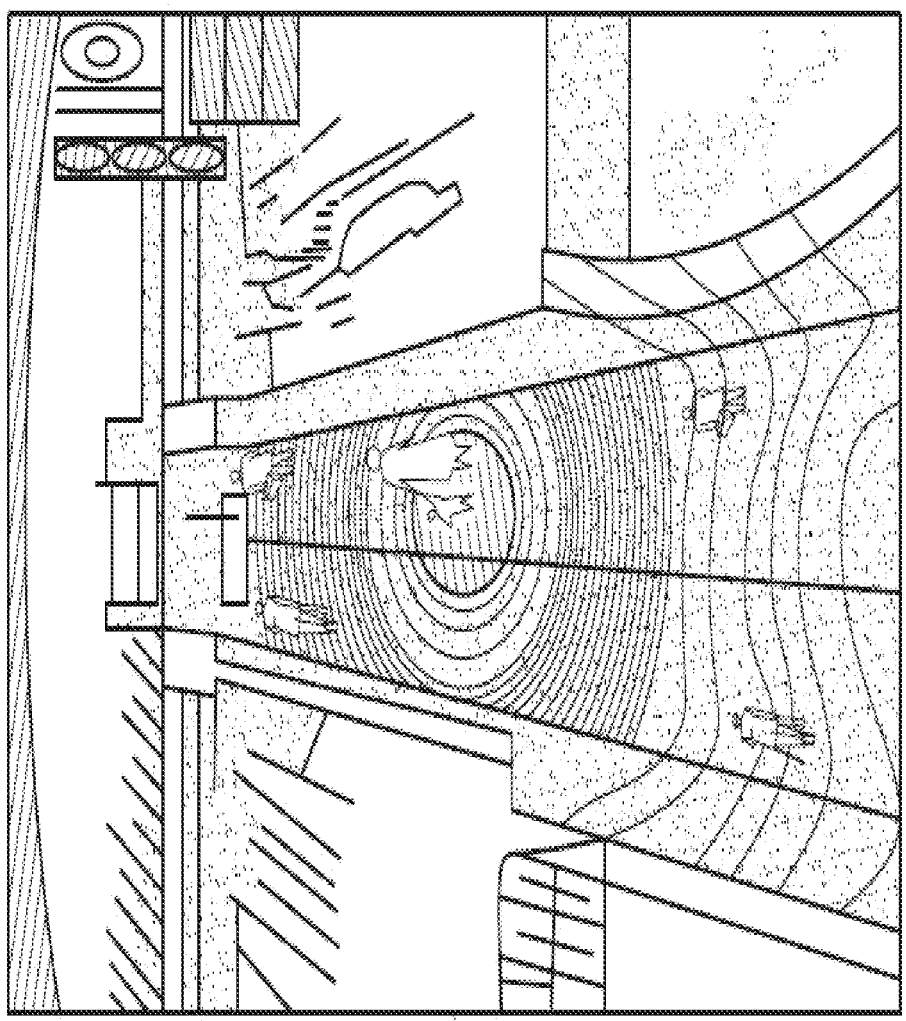
Figure 4B:
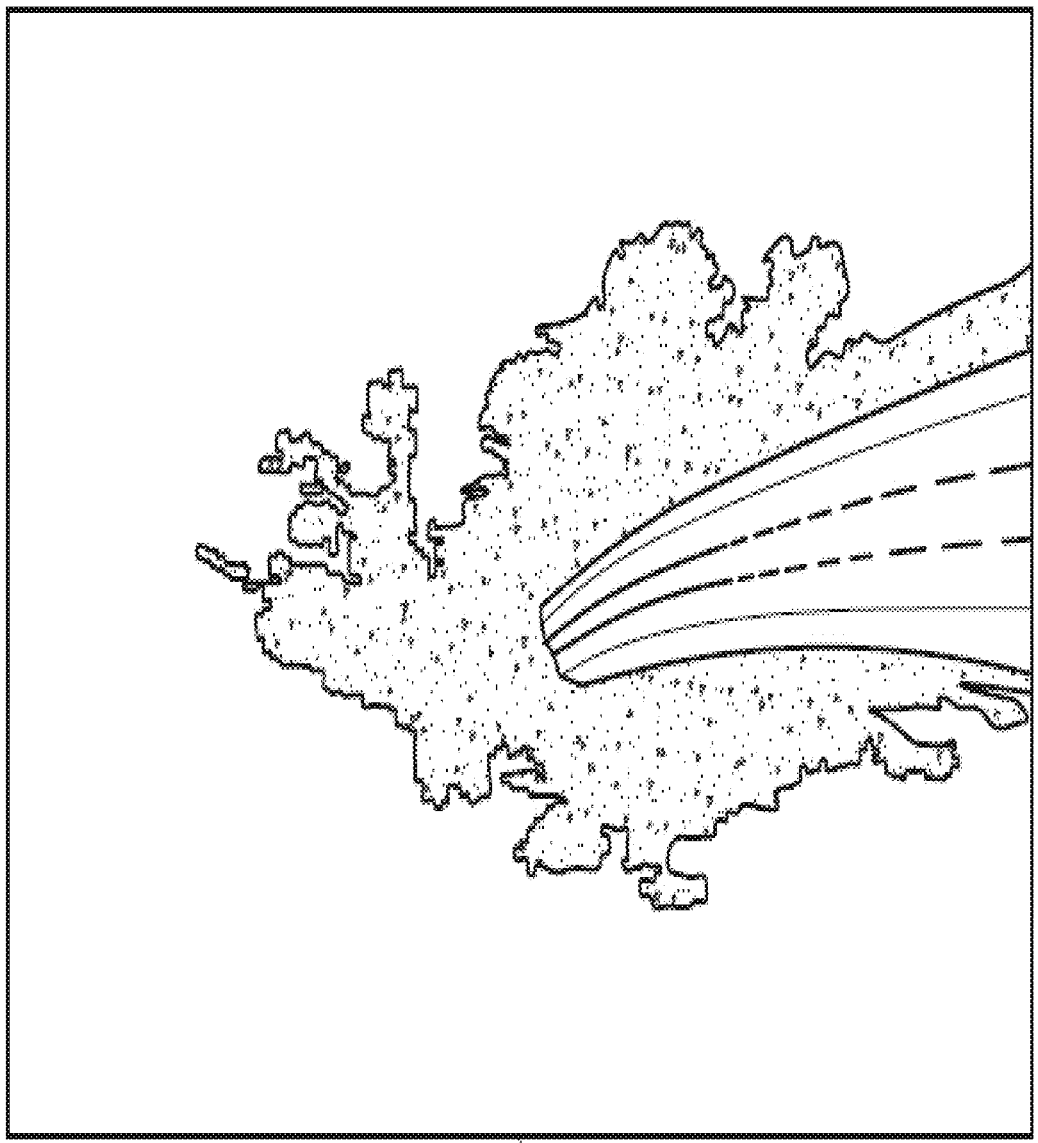

FIG. 4B shows an illustration of different sensor measurements collected 409a according to various embodiments of the present disclosure. For instance, the first measurement of the collected measurements 409a is a camera measurement 420d that together with a computer vision algorithm measures the lane markings of the road, and the second measurement is a lidar 440d that measures a distance to the environment, e.g., road barriers and other vehicles. Additionally or alternatively, the measurements 409a are a combination of measurements that provide a measurement of the vehicle in its environment 410d, 430d, e.g., with the environment mapped offline a priori by optimizing the weights according to the corresponding model's fit with the measurement.

Some embodiments use a first hypothesis of a noise covariance of a measurement and a second hypothesis of a noise covariance of said measurement, wherein the first hypothesis is used by one of the probabilistic filters and the second hypothesis is used by another of the probabilistic filters within the compound filters.

Figure 4C:
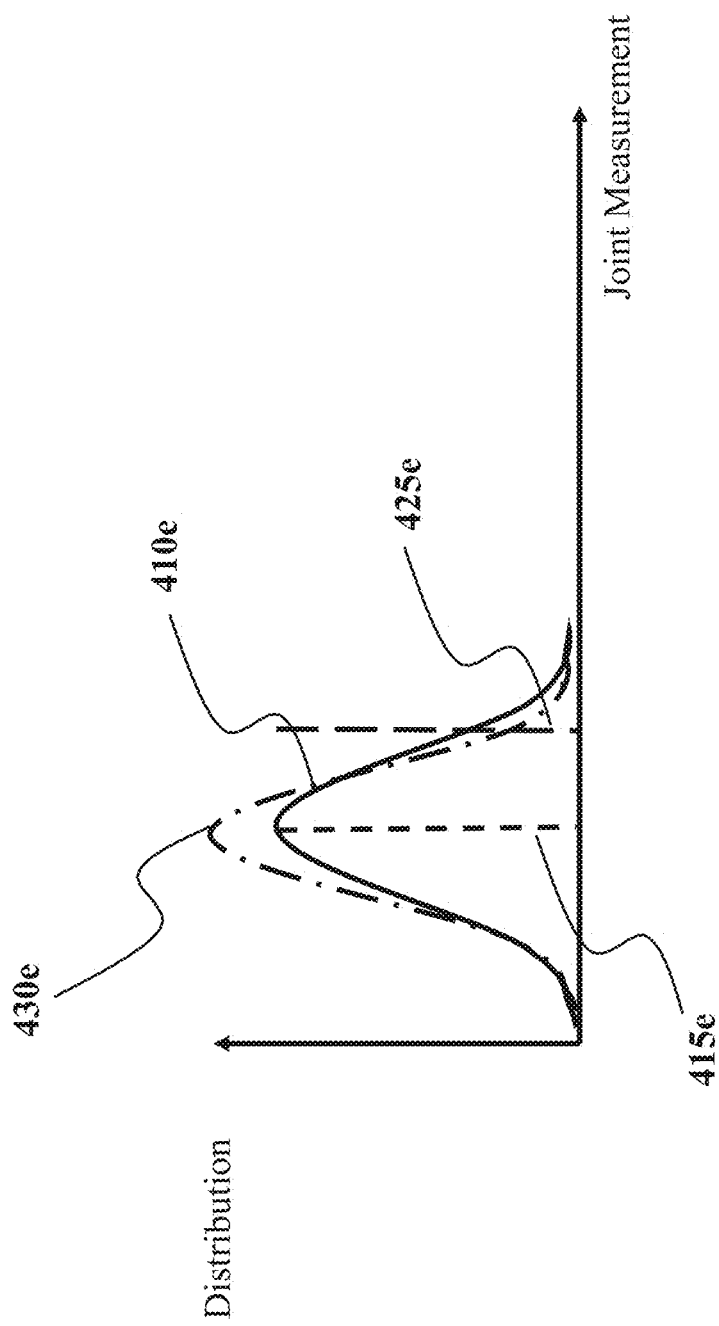
FIG. 4C shows an illustration of a situation where there is an estimated measurement that is compared by a collected measurement of a sensor, according to various embodiments of the present disclosure.

FIG. 4C shows an illustration of a situation where there is an estimated measurement 415e that is compared by a collected measurement 425e of a sensor. In one probabilistic filter a hypothesis of distribution 430e is used, where another probabilistic filter uses a hypothesis of distribution 410e. Consequently, for the scenario in FIG. 4C, the probabilistic filter using the hypothesis of distribution 430e accurately describes the collected measurement, as the probability at the value of the collected measurement 425e is higher for the distribution 410e than the distribution 430e.

Figure 4D:
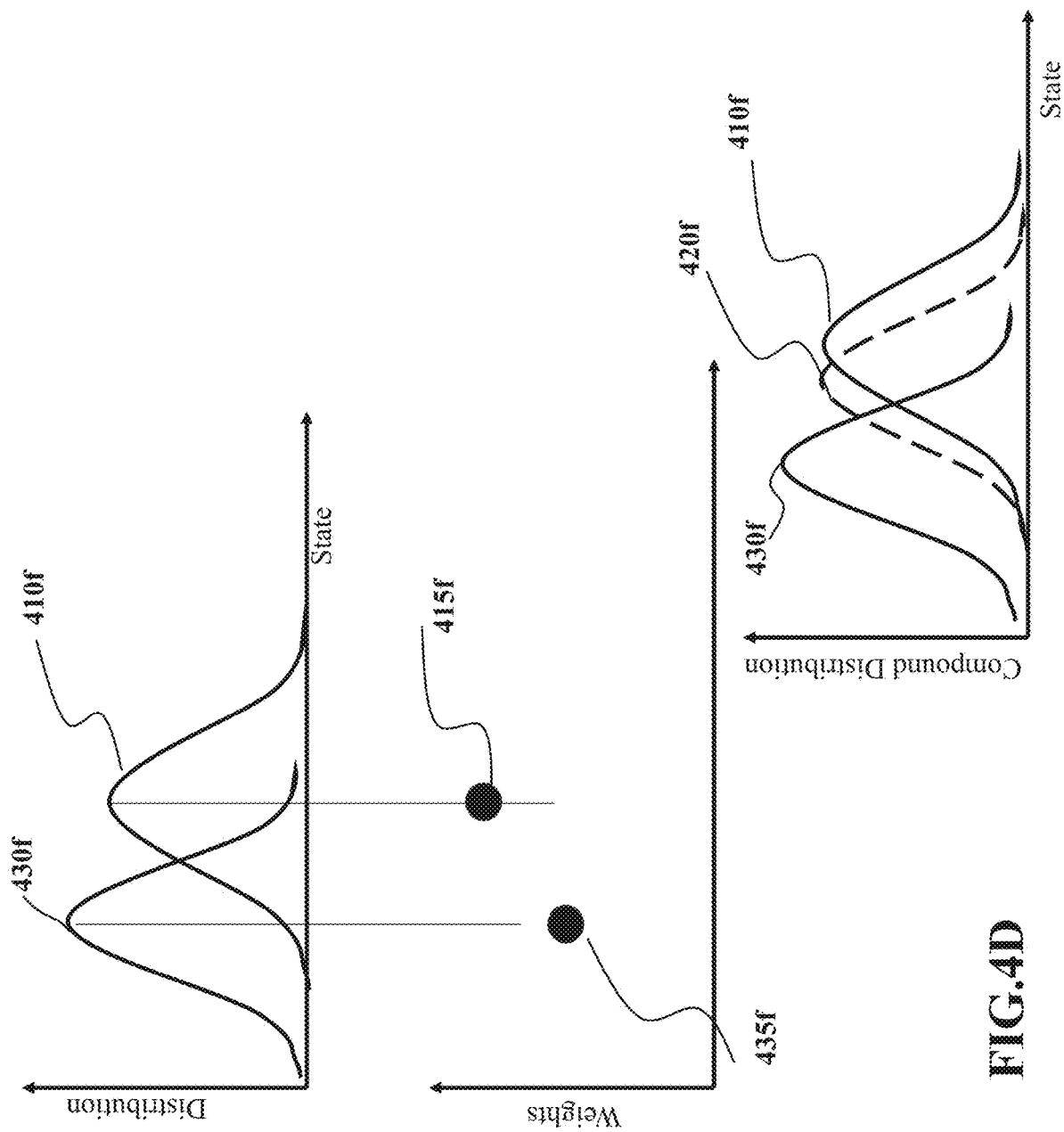
FIG. 4D shows an illustration of how different estimations of probabilistic filters are assigned different weights and forms a compound distribution, according to various embodiments of the present disclosure.

FIG. 4D shows an illustration of how different estimations of the probabilistic filters are assigned different weights and forms a compound distribution, according to various embodiments of the present disclosure. The first probabilistic filter 420a estimates a state distribution 430f and a second probabilistic filter 410a estimates a state distribution 410f. Weights 435f and 415f for each probabilistic filter are determined. A compound distribution 420f is determined as a weighted combination of the state distributions 430f and 410f.

Figure 4E:
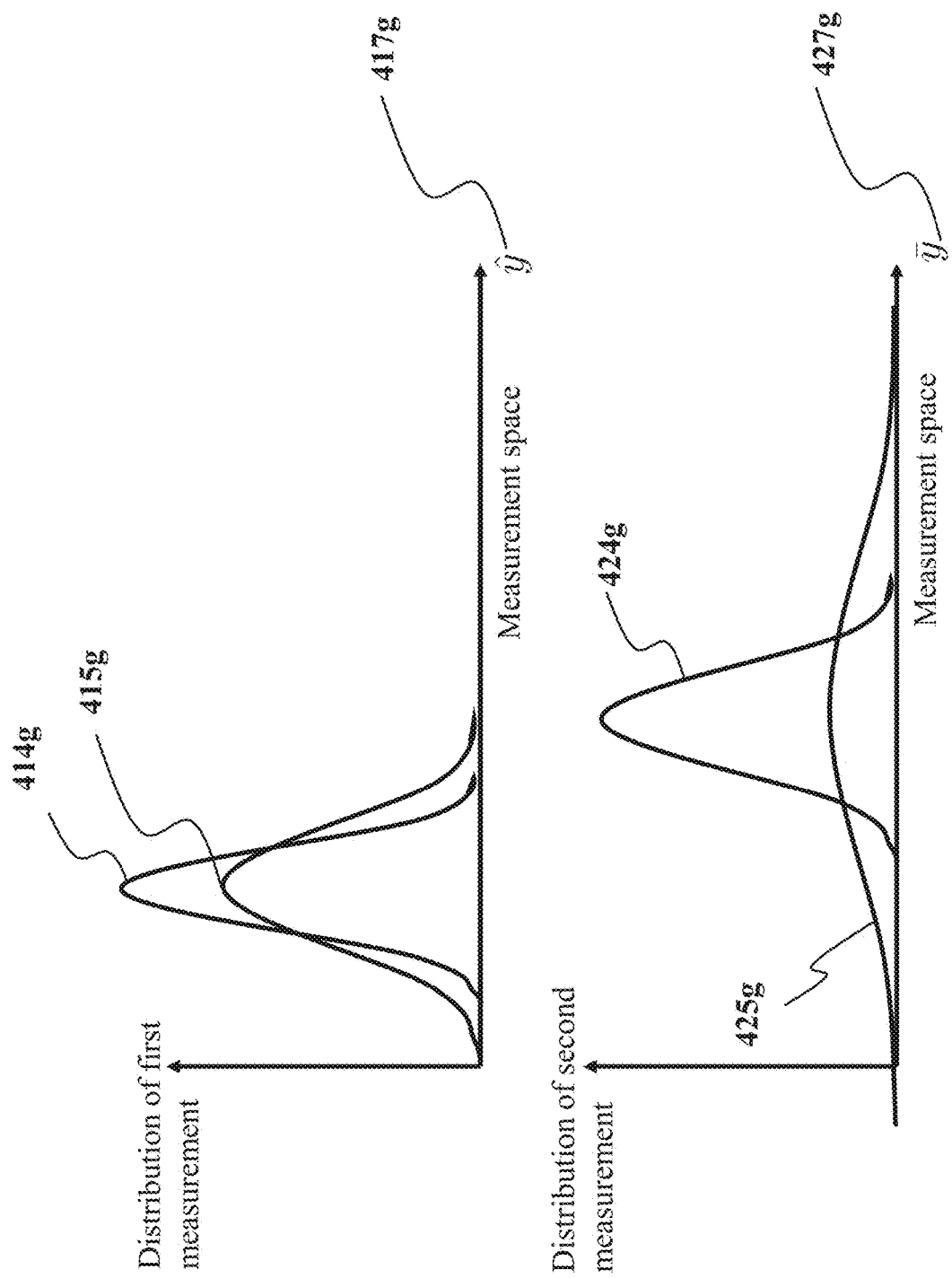
FIG. 4E shows an illustration of how different sensors get different weighting and that they are defined on different measurement spaces, according to various embodiments of the present disclosure.

FIG. 4E shows an illustration of how different sensors get different weighting and that they are defined on different measurement spaces, according to various embodiments of the present disclosure. For instance, some embodiments use a first hypothesis of distribution 414g, a second hypothesis of distribution 415g for a first measurement defined on a measurement space 417g, and a first hypothesis of distribution 424g, a second hypothesis of distribution 425g for a second measurement defined on a second measurement space 427g. In several embodiments, the distributions 414g and 415g for the first measurement space 417g belong to the same measurement space 417g, while the distributions 424g and 425g for a second measurement space 427g belong to the same measurement space 427g. Subsequently, 414g and 415g can be combined in different ways with 425g and 424g. For example, the combination 414g and 425g can be used in one probabilistic filter, whereas the combination 414g and 424g can be used in another probabilistic filter. Since the distributions 414g and 415g are defined on the same measurement space, they can be used directly in individual filters for a subsequent measurement update.

One embodiment recognizes that because the first measurement is defined on the measurement space 417g and the second measurement is defined on the second measurement space 427g, they cannot be compared directly.

Figure 4F:
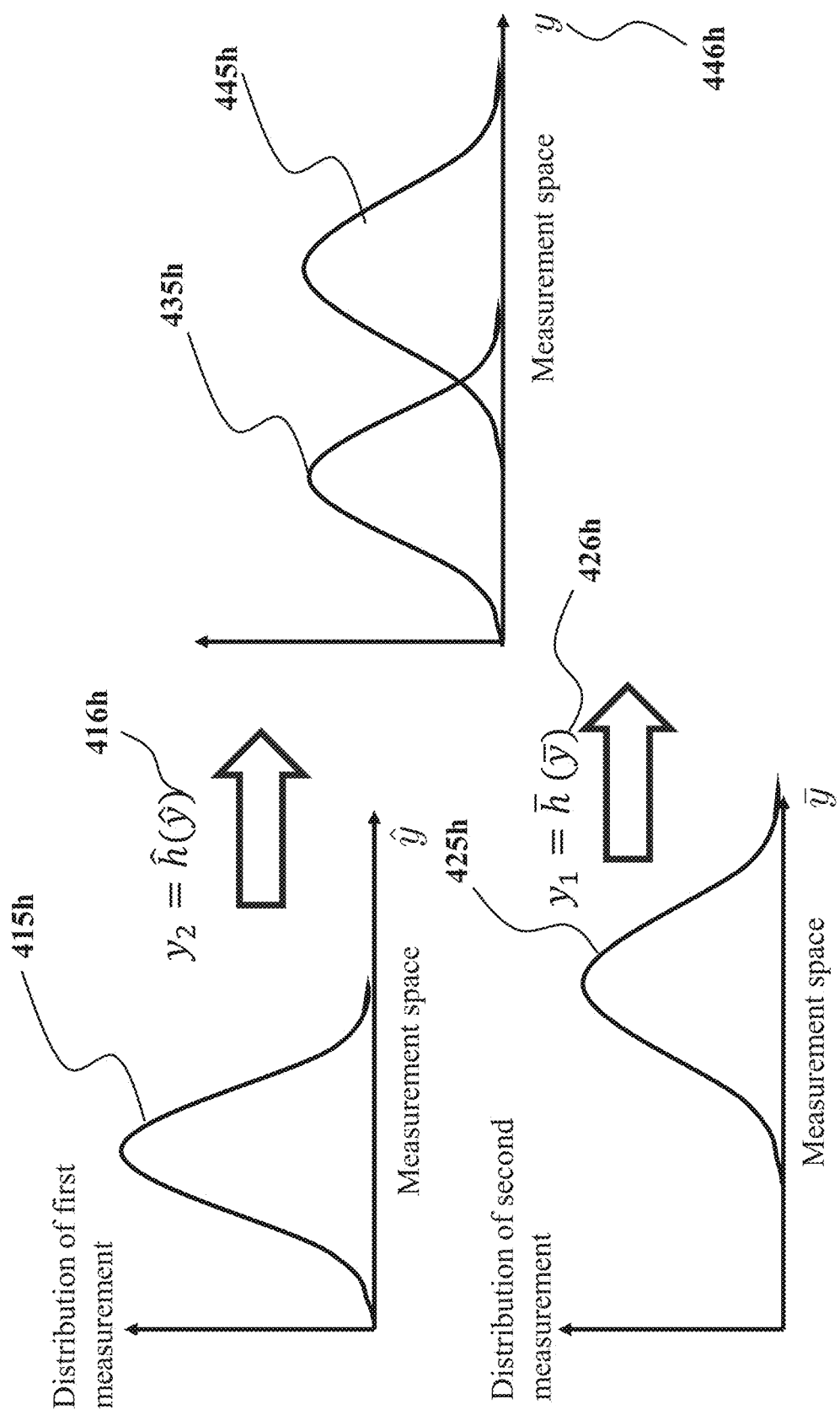
FIG. 4F shows an illustration how measurements defined on different measurement spaces are transformed to the same measurement space for comparing each other, according to various embodiments of the present disclosure.

FIG. 4F shows an illustration how measurements defined on different measurement spaces are transformed to the same measurement space for comparing each other, according to various embodiments of the present disclosure. Some embodiments transform a distribution 415h of a first measurement using a transformation 416h and transform a distribution 425h of a second measurement using a transformation 426h, to result in a distribution 435h of the first measurement, a distribution 445h of the second measurement, wherein the distributions are defined on the same measurement space 446h and can thus be compared and weighted to each other.

Some embodiments employ the different sensors by using a joint measurement model. For instance, referring to FIG. 4F, some embodiments model the joint measurement model as a joint Gaussian distribution having a mean and covariance according to $$y = [y_1 y_2]^T = \mathcal{N}\left(\left[\bar{h}(\hat{y}) \hat{h}(\hat{y})\right]^T\right),$$

$$\begin{bmatrix} R_1 & R_{12} \\ R_{21} & R_2 \end{bmatrix},$$

wherein covariance elements $R_1$, $R_{12}$, $R_{21}$ and $R_2$, are measurement noise covariance unique for each probabilistic filter.

In some embodiments, the outputted estimate 435a of the state of the vehicle is used to control the vehicle. In one embodiment, a model-predictive controller (MPC) is used for controlling the vehicle based on the outputted estimate 435a of the state of the vehicle.

Figure 5:
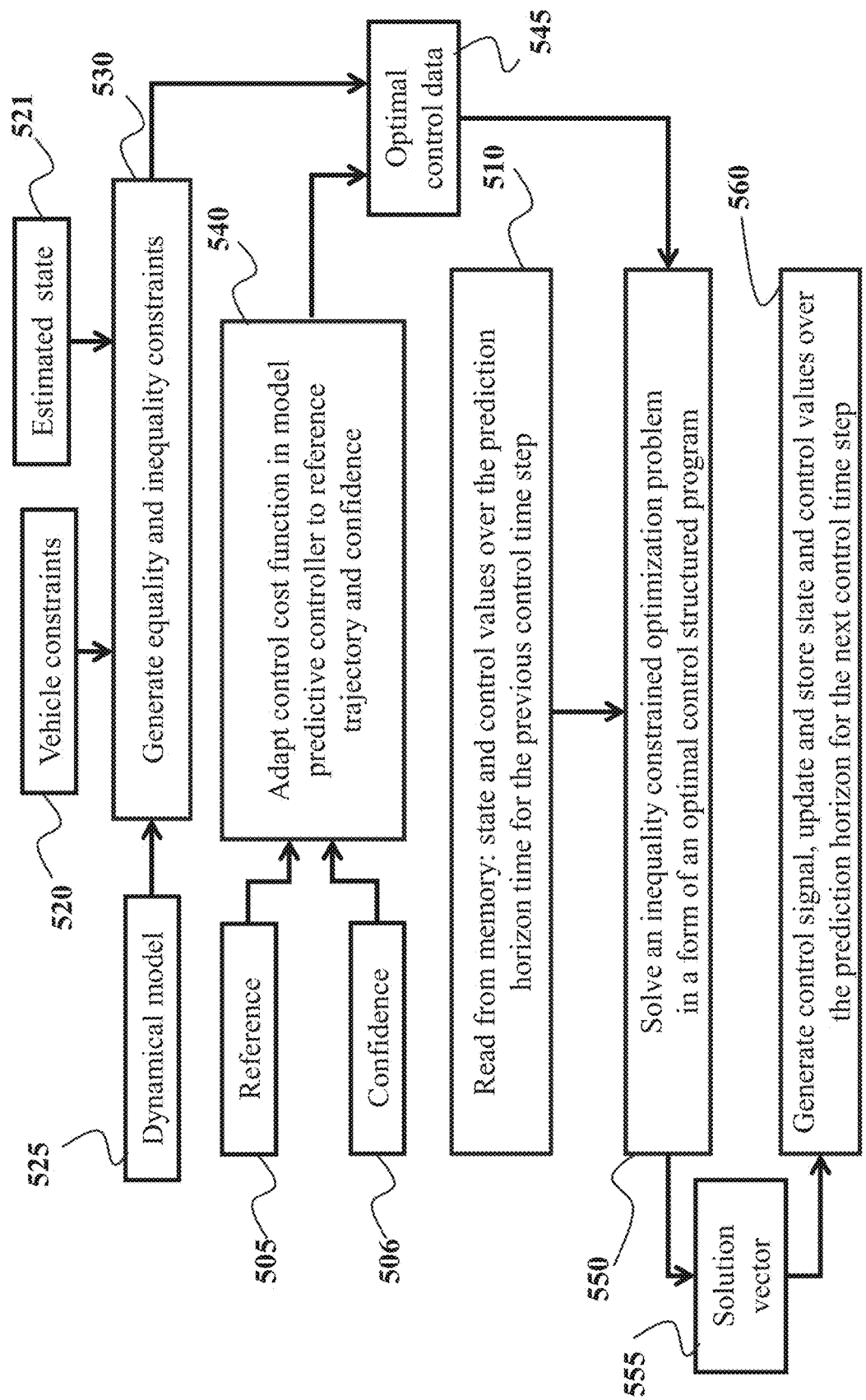
FIG. 5 shows a block diagram for controlling the vehicle based on an estimated state, according to various embodiments of the present disclosure.

FIG. 5 shows a block diagram for controlling the vehicle based on an estimated state 521, according to various embodiments of the present disclosure. Specifically, MPC computes a control solution, e.g., a solution vector 555 by solving an inequality constrained optimization problem in a form of an optimal control structured program 550 at each control time step. The solution vector 555 includes a sequence of future optimal control inputs over a prediction time horizon of the system. Optimal control data 545 of a control cost function 540, equality and inequality constraints 530 in the optimization problem 550 depends on a dynamical model 525, vehicle constraints 520, the current estimated state of the vehicle 521 and a control command that includes of a reference 505 and a confidence 506.

In some embodiments, the solution of the inequality constrained optimization problem 550 uses state and control values over the prediction time horizon from the previous control time step 510, which can be read from a memory of the MPC. This concept is called warm- or hot-starting of optimization algorithm, which considerably reduces the required computational effort of the MPC. In a similar manner, the corresponding solution vector 555 can be used to update and store a sequence of optimal or suboptimal state and control values for the next control time step 560.

In some embodiments of the present disclosure, the MPC adapts one or multiple terms in the control cost function 540 to the reference 505 and corresponding confidence 506 that are computed by the compound probabilistic filter 104a.

In an embodiment, the prediction model used by the probabilistic filter to predict the current state of the vehicle (e.g., current state 120b) may be a motion model of state transitions of the vehicle subject to the process noise. An example of the motion model is described below in FIG. 6A.

Figure 6A:
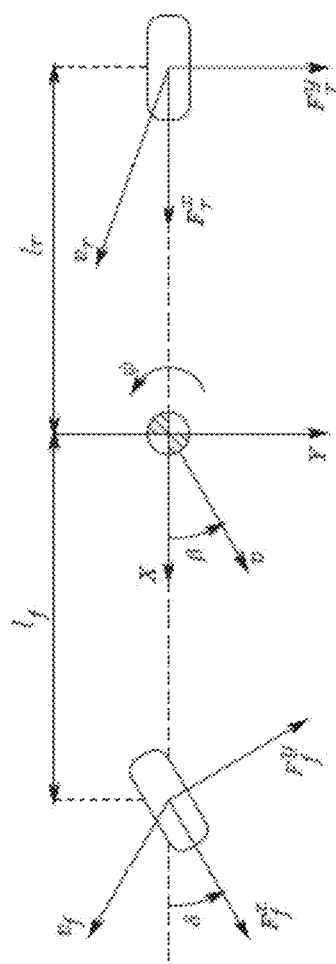
FIG. 6A shows an illustration of a motion model employed in the probabilistic filter, according to some embodiments of the present disclosure.

FIG. 6A shows an illustration of the motion model employed in the probabilistic filter, according to some embodiments of the present disclosure. The motion model is a single-track model, i.e., bicycle model, which has been shown to be valid in normal driving scenarios. In some embodiments, a state vector is $x=(p^x, p^Y, v^x, v^Y, \psi)$, i.e., the position, velocity, and heading rate of the vehicle. Furthermore, according to the embodiment shown in FIG. 6A, v may represent the velocity at the center of gravity, $v_f$ may represent the front wheel velocity, and $v_r$ may represent the rear wheel velocity. In some other embodiments, the time evolution of the vehicle is modeled as by force moment balances as $$m(\dot{v}^X - \dot{v}^Y \psi) = F_f^x \cos(\delta) + F_r^x - F_f^y \sin(\delta),$$

$$m(\dot{v}^Y - \dot{v}^X \psi) = F_f^y \cos(\delta) + F_r^y - F_f^x \sin(\delta),$$

$$I\ddot{\psi} = l_f(F_f^y \cos(\delta) + F_f^x \sin(\delta)) - l_r F_r^y,$$

where m is mass and I is inertia, and F with subscripts are forces acting on the vehicle. The resulting model is nonlinear, and in some embodiments the model is concisely written as $x_{k+1} = f(x_k, u_k) + w_k^x$, where $w_k^x \sim \mathcal{N}(0, Q^x)$, i.e., zero-mean Gaussian process noise.

In other embodiments, the single-track model is kinematic, i.e., it ignores force moment balances. For instance, in one embodiment, the kinematic single-track model is $$\dot{z} = \begin{bmatrix} \frac{v^x \cos(\psi + \beta)}{\cos(\beta)} \\ \frac{v^x \sin(\psi + \beta)}{\cos(\beta)} \\ v^x \tan(\delta_f)/L \end{bmatrix}$$

wherein $z = (p^X, p^Y, \psi) \in \mathbb{R}^{n_z}$ is the state.

Figure 6B:
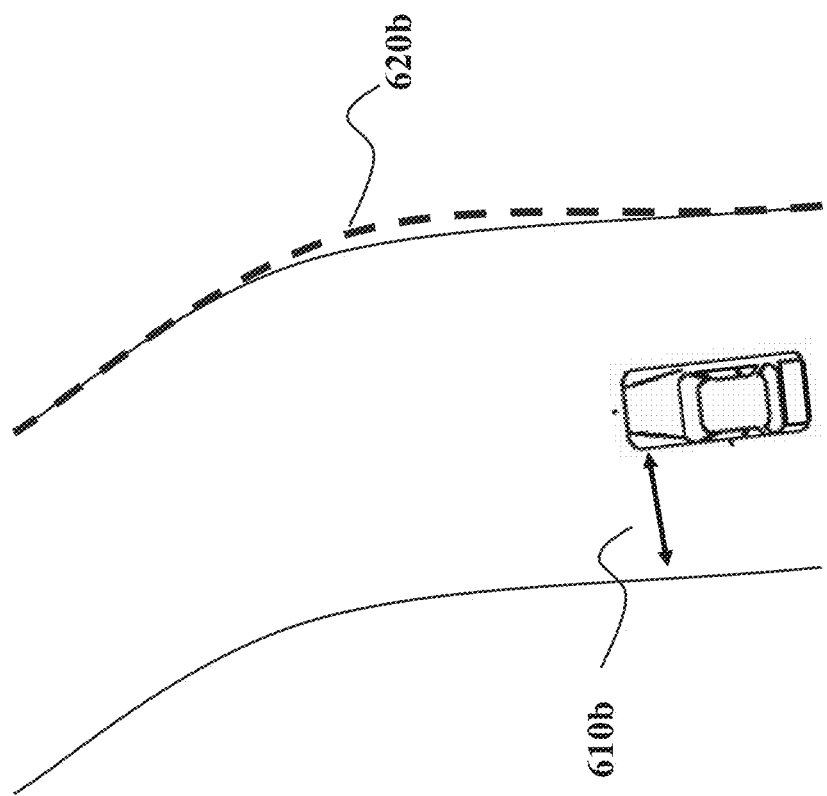
FIG. 6B illustrates how camera measurements produce distances to lane markings of a road and an approximation of road ahead, according to some embodiments of the present disclosure.

Further, the state predicted (e.g., state z) by the motion model is updated using the measurement model. The measurement model used in the probabilistic filter models the measurements (such as GNSS measurements). Some embodiments model the GNSS measurements as position measurements preprocessed by a probabilistic filter, e.g., a mixed-integer Kalman filter or a particle filter. Other embodiments model the camera measurements as distances to the lane markings of the road and an approximation of the road ahead, e.g., as illustrated in FIG. 6B, where a camera measures a distance 610b to the lane markings of either lane or the lane markings as a polynomial expression 620b of the road ahead. Some other embodiments leverage a prior map of the road to relate the relative position measurements a camera gives, with global position measurements a GNSS gives. Further embodiments leverage inertial measurement unit including accelerometer and gyro to further enhance the vehicle state estimation. Some embodiments model the measurement model as Gaussian distributed according to $y_k = h(x_k, u_k) + e_k$, where $e_k$ is zero-mean Gaussian distributed with a block-diagonal covariance matrix, wherein elements of a covariance matrix are hypothesized for each of the multiple probabilistic filters 121a-123a of the compound probabilistic filter 104a. Some embodiments are based on the recognition that typically the first two moments (e.g., mean and variance) describe a distribution well, even though the underlying distribution is not Gaussian. In some embodiments, this recognition is utilized in the determining the covariance of the vehicle state.

Some embodiments update parameters of probabilistic distribution, i.e., mean and covariance using the measurement model. For instance, one embodiment updates the parameters of probabilistic distribution using the Kalman filter (KF). Another embodiment acknowledges that the motion model and the measurement model is nonlinear for some states of the vehicle. To this end, some embodiments employ nonlinear KFs, such as linear-regression KF, to update the parameter of probabilistic distribution. Linear-regression KFs are filters that determine the first and second moment by having the moment integrals including $$m^o \int_{\mathbb{R}^I} g(i) \mathcal{N}(i|m^i, \Sigma^{ii}) di \text{ and } \Sigma^{oo} \int_{\mathbb{R}^I} (g(i) - m^o(g(i) - m_o)^\tau \mathcal{N}(i|m^i, \Sigma^{ii})^{di}$$

evaluated at a set of integration points $\mathcal{P} = \{(w^{(i)}, \xi^{(i)})\}_{i=1}^{K(I)}$.

Some embodiments approximate the posterior density for each probabilistic filter as the Gaussian approximation $p(\bar{x}_k | y_{0:k}) \approx \mathcal{N}(\bar{x}_{k|k}, P_{k|k})$. Given an assumed Gaussian filtering posterior at time step k, distribution at time step k+1 is subsequently approximated as a Gaussian, $$p(\bar{x}_{k+1} | \bar{x}_k, y_{0:k}) \approx \mathcal{N}(\bar{x}_{k+1} | \bar{x}_{k+1|k}, P_{k+1|k}),$$

by direct evaluation of the associated moment integrals, $$\bar{x}_{k+1|k} = \int f(\bar{x}_k) p(\bar{x}_k | y_{0:k}) d\bar{x}_k$$

$$P_{k+1|k} = \int (f(\bar{x}_k) - \bar{x}_{k+1|k})(*)^T p(\bar{x}_k | y_{0:k}) d\bar{x}_k + Q_k$$

Some embodiments assume the process noise enters additively, which considerably simplifies computations.

Some other embodiments leverage LRKFs for determining the associated moment integrals, wherein a set of integration points are used. For instance, some embodiments use integration points according to an unscented transform, other embodiments leverage a spherical cubature rule. However, any set of integration schemes can be used.

In some embodiments, the compound probabilistic filter 104a is implemented according to an interacting multiple model (IMM) framework. Using IMM enables a systematic way to incorporate a first measurement and second measurement using different combinations of hypothesis of the noise covariances of the measurements. At each time step k, the IMM assigns a weight $q_k$ to each model reflecting the probability of explaining the measurements.

Some embodiments define the prediction model according to $$\bar{x}_{k+1} = \bar{f}(\bar{x}_k; u_k) + w_k, w_k \sim \mathcal{N}(0, Q_k),$$

$$y_k = h(\bar{x}_k; u_k) + e_k(\theta_k), e_k \sim \mathcal{N}(0, R_k^{\theta_k}),$$

where the model parameter $\theta_k \in [1, m] \subset \mathbb{N}$ evolves according to a finite state Markov chain with transition probability $\Pi \in [0,1]^{m \times m}$ In some embodiments, for each possible $\theta_k \in [1, m] \subset \mathbb{N}$, different hypotheses of measurement noise are created according to $$\{R^{\theta_k} \in \mathbb{R}^{n_e \times n_e} | R^{\theta_k} = (R^{\theta_k})^T, R^{\theta_k} > 0\}_{\theta_k=1}^m.$$

At each time step of estimation, the IMM uses a transition matrix to mix the different m models, $$\bar{q}_k^i = \sum_{l=1}^m \prod_{ij} q_{k-1}^j,$$

$$\hat{x}_{k-1|k-1}^i = \sum_{l=1}^m \prod_{ij} \frac{q_{k-1}^j}{\bar{q}_k^i} \hat{x}_{k-1|k-1}^j,$$

$$P_{k-1|k-1}^i = \sum_{l=1}^m \prod_{ij} \frac{q_{k-1}^j}{\bar{q}_k^i} \left( P_{k-1|k-1}^j + \left( \hat{x}_{k-1|k-1}^j - \hat{x}_{k-1|k-1}^i \right)(\star)^T \right).$$

After such mixing, some embodiments run m probabilistic filters to determine the vehicle state estimate. Subsequently, the posterior distribution is determined according to $$p(\bar{x}_k | y_{0:k}) =$$

$$\sum_{j=1}^m p(\bar{x}_k^j | y_{0:k}) = \frac{\sum_{l=1}^m p(y_k | \bar{x}_k^j) p(\bar{x}_k | y_{0:k-1})}{p(y_k | y_{0:k-1})} \approx \sum_{j=1}^m q_k^j \mathcal{N}(\bar{x}_k^j | \hat{x}_{k|k-1}^j, P_{k|k-1}^j)$$

that is, a weighted combination of each of the probabilistic filters, wherein the weighting is done according to its fit with the measurement normalized with the hypothesized noise covariance, $$q_k^j \propto p(y_k | \bar{x}_k^j) = \mathcal{N}(y_k | y_{k|k-1}^j, p_{k|k-1}^{yy,j}) \bar{q}_k^j, \forall j \in [1, m]$$

Some embodiments provide a controller for controlling the movement of the vehicle based on a state of the vehicle tracked using the GNSS measurements. Such a controller is explained in detail in FIG. 7 below.

Figure 7:
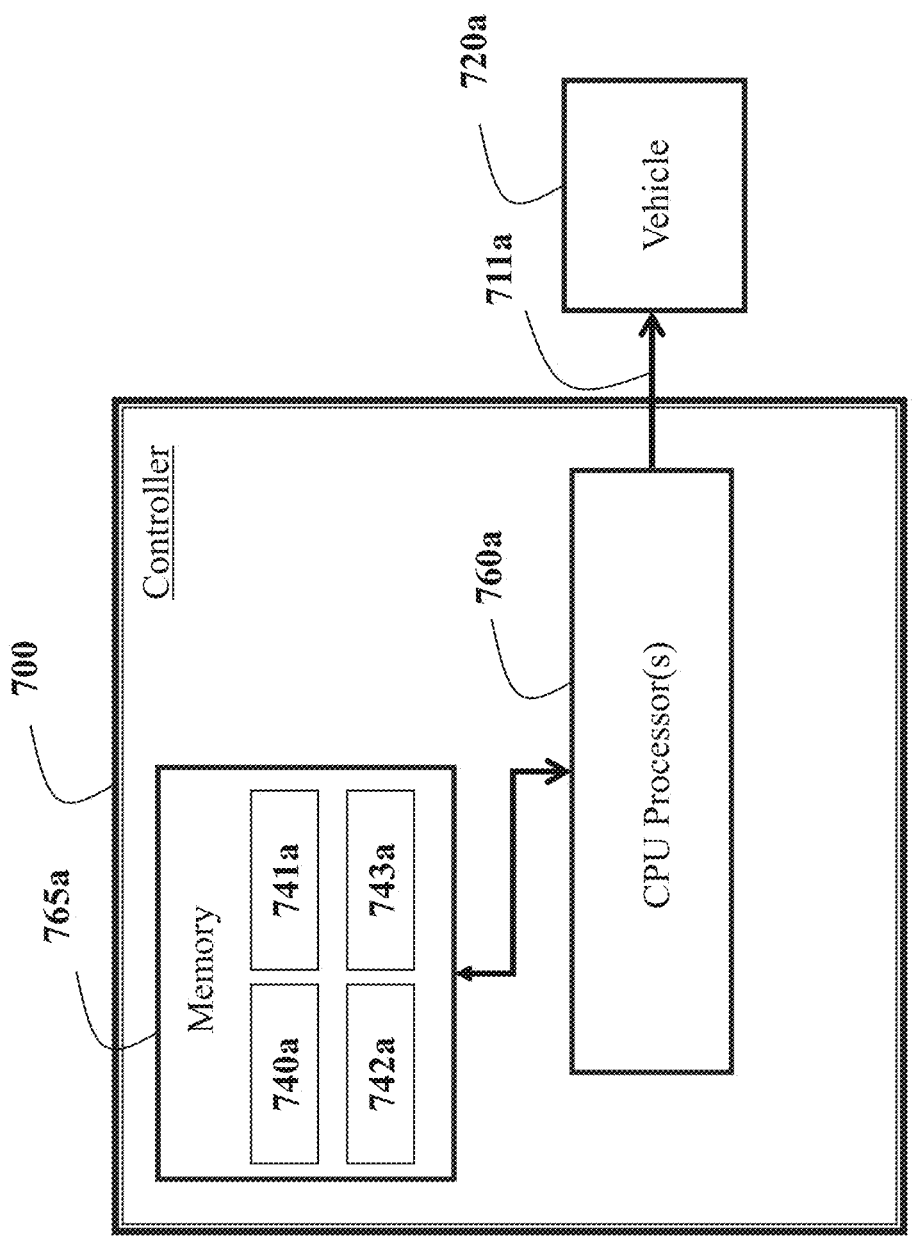
FIG. 7 shows a block diagram of a controller for controlling the movement of the vehicle based on the state of the vehicle tracked using the GNSS measurements, according to some embodiments of the present disclosure.

FIG. 7 shows a block diagram of a controller 700 for controlling the movement of a vehicle 720a based on a state of the vehicle 720a tracked using the GNSS measurements, according to some embodiments of the present disclosure. The controller 700 is communicatively coupled to the vehicle 720a. The controller 700 includes a computer, e.g., in the form of a single central processing unit (CPU) or multiple CPU processors 760a connected to a memory 765a for storing a motion model 740a, a measurement model 741a, the constraints 742a and hypothesis of noise covariances 743a of measurements of the vehicle 720a. The processor(s) 760a can be a single core microprocessor, a multi-core processor, a computing cluster, a network of multiple connected processors, or any number of other configurations. The memory 765a can include random access memory (RAM), read only memory (ROM), flash memory, or any other suitable memory systems.

The controller 700 executes the steps of the method described in FIG. 2A to estimate the state of the vehicle 720a. Based on the estimated state of the vehicle 720a, the controller 700 generates control inputs 711a. The controller 700 controls the vehicle 720a based on the control inputs 711a.

Figure 8A:
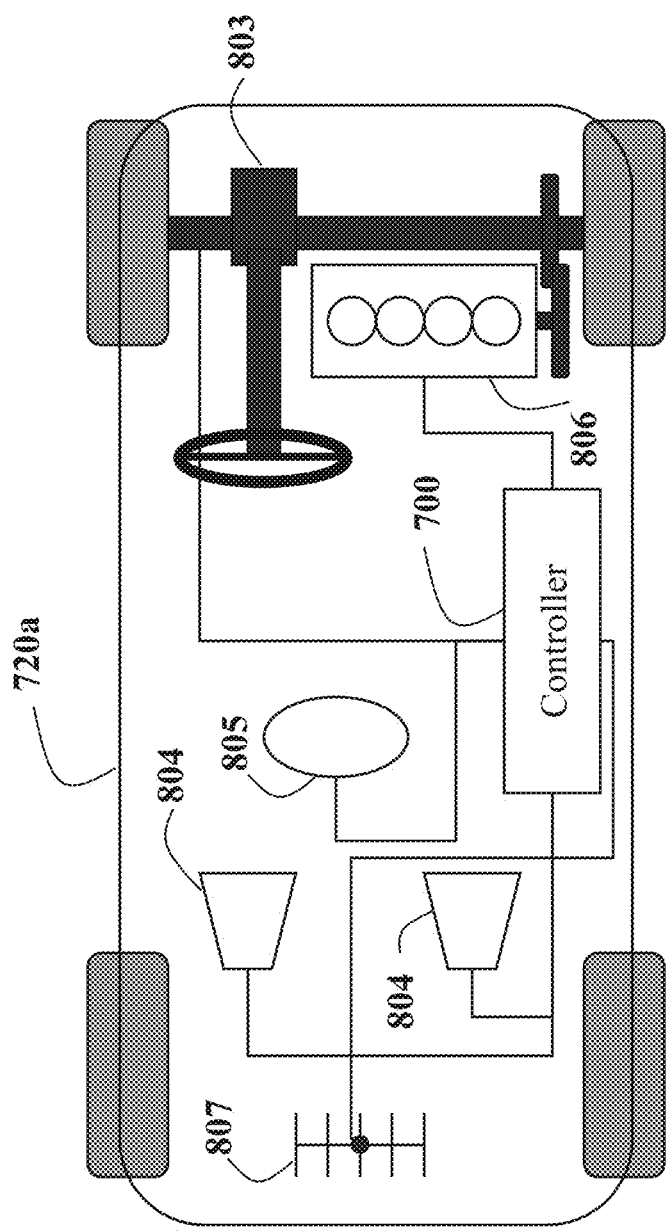
FIG. 8A shows a schematic of a vehicle including the controller for controlling a movement of the vehicle, according to some embodiments of the present disclosure.

FIG. 8A shows a schematic of the vehicle 720a including the controller 700, according to some embodiments of the present disclosure. As used herein, the vehicle 720a can be any type of wheeled vehicle, such as a passenger car, bus, or rover. Also, the vehicle 720a can be an autonomous or semi-autonomous vehicle. For example, some embodiments control the motion of the vehicle 720a. Examples of the motion include lateral motion of the vehicle controlled by a steering system 803 of the vehicle 720a. In one embodiment, the steering system 803 is controlled by the controller 700. Additionally, or alternatively, the steering system 803 can be controlled by a driver of the vehicle 720a.

The vehicle can also include an engine 806, which can be controlled by the controller 700 or by other components of the vehicle 720a. The vehicle 702a can also include one or more sensors 804 to sense the surrounding environment. Examples of the sensors 804 include distance range finders, radars, lidars, and cameras. The vehicle 720a can also include one or more sensors 805 to sense its current motion quantities and internal status. Examples of the sensors 805 include global positioning system (GPS), accelerometers, inertial measurement units, gyroscopes, shaft rotational sensors, torque sensors, deflection sensors, pressure sensors, and flow sensors. The sensors provide information to the controller 700. The vehicle can be equipped with a transceiver 807 enabling communication capabilities of the controller 700 through wired or wireless communication channels.

Figure 8B:
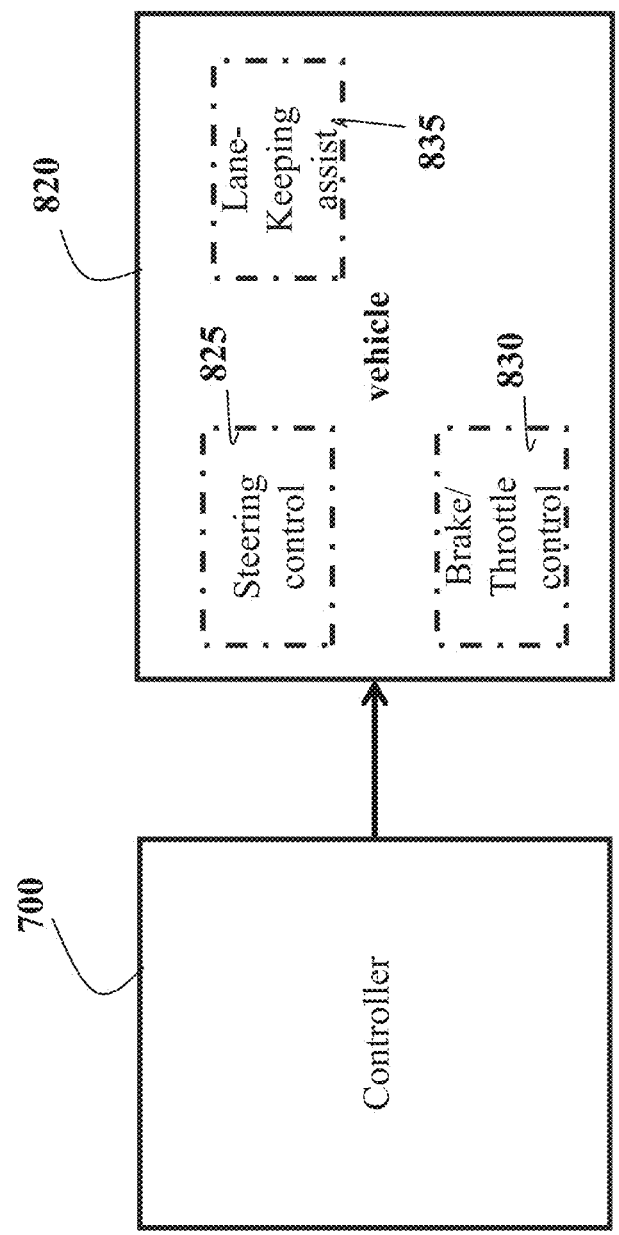
FIG. 8B shows a schematic of interaction between the controller and controllers of the vehicle, according to some embodiments of the present disclosure.

FIG. 8B shows a schematic of interaction between the controller 700 and controllers 820 of the vehicle 720a, according to some embodiments of the present disclosure. For example, in some embodiments, the controllers 820 of the vehicle 720a are steering controller 825 and brake/throttle controllers 830 that control rotation and acceleration of the vehicle 720a. In such a case, the controller 700 outputs control inputs to the controllers 825 and 830 to control the state of the vehicle 720a. The controllers 820 can also include high-level controllers, e.g., a lane-keeping assist controller 835 that further process the control inputs of the controller 700. In both cases, the controllers 820 use the outputs of the controller 700 to control at least one actuator of the vehicle, such as the steering wheel and/or the brakes of the vehicle 720a, in order to control the motion of the vehicle 720a.

Alternatively, in some embodiments, the feedback controller 100 may be used in place of the controller 700 to control the vehicle 720a. The feedback controller 100 also provides control inputs to the controllers 820, based on the estimated state of the vehicle 720a, in order to control the motion of the vehicle 720a Some embodiments are based on the understanding that the precision of a sensor can vary with time, both smoothly and abruptly. Other embodiments recognize that probabilistic filters, such as KFs and LRKFs, in its standard formulation needs a priori set noise covariances of the measurements used to update the state estimate, wherein the noise covariances has effect of normalizing and weighing together the importance of each measurement. Some other embodiments are based on the realization that KFs that adapt the noise, e.g., using variational Bayes methods for noise adaptation, do not have convergence guarantees and does perform well when making small changes to the a priori set noise covariances. However, e.g., for the case of outliers in GPS measurements, such methods are prone to errors because the outliers tend to happen from one time step to another and noise adaptation methods are well known to have issues with correctly adapting such large changes to the noise covariances in real time. E.g., variational Bayes methods for noise estimation is dependent on tuning factors, for example a forgetting factor, which determines the rate at which changes in the state estimates can occur. Such forgetting factor is designed assuming slowly changing states. Hence, fast variations, as is the case for e.g. GNSS measurement reliability, is not well handled in such approaches. This is in contrast to the method disclosed in the present disclosure, which converge quickly because the probabilities for each probabilistic filter is determined using the likelihood having the hypothesis of measurement noise covariance incorporated into the likelihood.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A feedback controller for controlling a movement of a device based on a state of the device tracked using measurements of the movement indicative of the state of the device, the feedback controller comprising: at least one processor; and at least one memory having instructions stored thereon that, when executed by the at least one processor, causes the feedback controller to:
   collect a sequence of measurements indicative of the state of the device at different control steps;
   execute iteratively, a compound probabilistic filter configured to track the state of the device at each of the different control steps using the sequence of measurements to produce a sequence of states of the device corresponding to the sequence of measurements, wherein to perform an iteration for a current control step using a current measurement, the compound probabilistic filter is configured to:
   execute multiple probabilistic filters parameterized on the state of the device to produce multiple estimates of the state of the device for the current control step, wherein each of the multiple probabilistic filters iteratively predicts a current state of the device using a prediction model subject to process noise and updates the predicted current state based on the current measurement using a measurement model subject to a measurement noise, wherein different probabilistic filters of the multiple probabilistic filters have different measurement noises causing variations in the multiple estimates of the state of the device;
   estimate, for each of the multiple probabilistic filters, a likelihood of corresponding measurement noise to correlate the current measurement with the predicted current state;
   combine the multiple estimates of the state of the device into a weighted combination with normalized weights derived from the likelihoods estimated for corresponding probabilistic filters; and
   output the state of the device tracked by the compound probabilistic filter for the current control step based on the weighted combination; and
   control the device using the sequence of states tracked by the compound probabilistic filter.

2. The feedback controller of claim 1, wherein the compound probabilistic filter is configured to estimate the likelihoods of correlation of different measurement noises as likelihoods of the current measurement according to different measurement noises centered on an estimation of the predicted current state transformed into a measurement space.

3. The feedback controller of claim 2, wherein the predicted current state is transformed into the measurement space using the measurement model.

4. The feedback controller of claim 2, wherein each of the multiple probabilistic filters is a Kalman filter with the process noise and the measurement noise defined by corresponding Gaussian probabilistic distributions, such that a mean of the Gaussian probabilistic distributions is the estimation of the predicted current state transformed into the measurement space and different measurement noise covariances yield the Gaussian probabilistic distributions of the measurement noise.

5. The feedback controller of claim 4, wherein the estimation of the predicted current state transformed into the measurement space is common for all of the multiple probabilistic filters.

6. The feedback controller of claim 4, wherein the estimation of the predicted current state transformed into the measurement space is different for different probabilistic filters.

7. The feedback controller of claim 4, wherein the compound probabilistic filter is configured to estimate the likelihoods of correlation of different measurement noises based on values of gains of corresponding Kalman filters used for updating the predicted current state based on the current measurement.

8. The feedback controller of claim 7, wherein the gains are Kalman gains.

9. The feedback controller of claim 1, wherein the device is a vehicle tracked using measurements of a Global Navigation Satellite System (GNSS), and wherein the measurements include GNSS measurements.

10. The feedback controller of claim 1, wherein the feedback controller is operatively connected to a plurality of sensors of different types using at least one of: a wired link, a wireless link, or a combination thereof, to collect measurements of the plurality of sensors indicative of the state of the device, and wherein the measurement model of the multiple probabilistic filters fuses the measurements of the plurality of sensors to produce corresponding estimations of the state of the device.

11. A controller for controlling a movement of a vehicle based on a state of the vehicle tracked using measurements of a Global Navigation Satellite System (GNSS), the controller comprising: at least one processor; and at least one memory having instructions stored thereon that, when executed by the at least one processor, causes the controller to:
  collect a sequence of GNSS measurements indicative of the state of the vehicle at different control steps;
  execute iteratively, a compound probabilistic filter configured to track the state of the vehicle at the different control steps using the sequence of GNSS measurements to produce a sequence of states of the vehicle corresponding to the sequence of GNSS measurements, wherein to perform an iteration for a current control step using a current GNSS measurement, the compound probabilistic filter is configured to:
    execute multiple probabilistic filters having identical measurement models relating the current GNSS measurement with a current estimation of the state of the vehicle to produce multiple estimates of the state of the vehicle for the current control step, wherein the multiple probabilistic filters are subject to different measurement noise characteristics causing variations among the multiple estimates of the state of the vehicle;
    combine the multiple estimates of the state of the vehicle into a weighted combination with weights derived from likelihoods of the current GNSS measurement according to different measurement noises centered on an estimation of the current GNSS measurement predicted by one or a combination of the multiple probabilistic filters; and
    estimate the state of the vehicle tracked by the compound probabilistic filter for the current control step based on the weighted combination; and
  control the vehicle using the sequence of states estimated by the compound probabilistic filter.

12. The controller of claim 11, wherein the multiple probabilistic filters include a first probabilistic filter configured to produce a first estimate of the state of the vehicle subject to a first measurement noise defined by a first probability density function (PDF) and a second probabilistic filter configured to produce a second estimate of the state of the vehicle subject to a second measurement noise defined by a second PDF different from the first PDF, wherein to produce the weighted combination, the compound probabilistic filter is configured to:
  determine the estimation of the current GNSS measurement by transforming a prediction of the current state of the vehicle from a state space to a measurement space;
  center the first PDF and the second PDF on the estimation of the current GNSS measurement;
  determine a first likelihood of the current GNSS measurement according to the first PDF centered on the estimation of the current GNSS measurement;
  determine a second likelihood of the current GNSS measurement according to the second PDF centered on the estimation of the current GNSS measurement;
  normalize the first likelihood and the second likelihood to determine a first weight for weighting the first estimate of the state of the vehicle and a second weight for weighting the second estimate of the state of the vehicle; and
  determine the weighted combination based on the first estimate of the state of the vehicle weighted with the first weight and the second estimate of the state of the vehicle weighted with the second weight.

13. The controller of claim 11, wherein the multiple probabilistic filters include a first probabilistic filter configured to produce a first estimate of the state of the vehicle subject to a first measurement noise defined by a first probability density function (PDF) and a second probabilistic filter configured to produce a second estimate of the state of the vehicle subject to a second measurement noise defined by a second PDF different from the first PDF, wherein to produce the weighted combination, the compound probabilistic filter is configured to:
  execute the first probabilistic filter to predict a first current state of the vehicle based on an internal state of the first probabilistic filter and update the first current state of the vehicle using a measurement model processing the current GNSS measurement according to a gain of the first probabilistic filter to produce the first estimate of the state of the vehicle;
  execute the second probabilistic filter to predict a second current state of the vehicle based on an internal state of the second probabilistic filter and update the second current state of the vehicle using the measurement model processing the current GNSS measurement according to a gain of the second probabilistic filter to produce the second estimate of the state of the vehicle; and
  update the internal state of the first probabilistic filter and the internal state of the second probabilistic filter based on a combination of the first estimate and the second estimate of the state of the vehicle produced by the first probabilistic filter and the second probabilistic filter.

14. The controller of claim 11, wherein the multiple probabilistic filters include a first probabilistic filter configured to produce a first estimate of the state of the vehicle subject to a first measurement noise defined by a first probability density function (PDF), wherein to produce a weight for scaling the first estimate of the state of the vehicle, the first probabilistic filter is configured to:
predict a current state of the vehicle using a motion model of the vehicle subject to process noise based on a previous control command applied to the vehicle having a previous state at a previous control step;
transform the predicted current state of the vehicle into a measurement space to produce the estimation of the current GNSS measurement;
center the first PDF on the estimation of the current GNSS measurement; and
determine a weight for weighting the first estimation of the state of the vehicle based on a likelihood of the current GNSS measurement according to the first PDF centered on the estimation of the current GNSS measurement.

15. The controller of claim 14, wherein a weight determined for the current control step based on the likelihood of the current GNSS measurement according to the first PDF is a current weight, wherein the compound probabilistic filter stores historic weights of the first probabilistic filter determined for a number of previous control steps, and updates a weight for weighting the first probabilistic filter at the current control step based on an average of the current weight and the historic weights.

16. The controller of claim 11, wherein the controller is operatively connected to a plurality of sensors using at least one of: a wired link, a wireless link, or a combination thereof, to collect measurements of the plurality of sensors indicative of the state of the vehicle, wherein the plurality of sensors includes a GNSS receiver collecting the GNSS measurements, and wherein a measurement model of the multiple probabilistic filters fuses the measurements of the plurality of sensors to produce corresponding estimations of the state of the vehicle.

17. The controller of claim 16, wherein in addition to the GNSS receiver, the plurality of sensors include one or a combination of a camera producing color images, a depth sensor producing depth images, a roadside unit (RSU) producing fused measurements of multiple remote sensors.

18. The controller of claim 17, wherein the plurality of sensors includes a first sensor collecting first measurements and a second sensor collecting second measurements, wherein each of the multiple probabilistic filters tracks the state of the vehicle based on the first measurements and the second measurements, wherein the multiple probabilistic filters include a first probabilistic filter tracking the state of the vehicle using a first hypothesis of noise covariance of the first measurements and a first hypothesis of noise covariance of the second measurements, and a second probabilistic filter tracking the state of the vehicle using a second hypothesis of noise covariance of the first measurements and a second hypothesis of noise covariance of the second measurements, wherein the first hypothesis of noise covariance of the first measurements is different from the second hypothesis of noise covariance of the first measurements, or the first hypothesis of noise covariance of the second measurements is different from the second hypothesis of noise covariance of the second measurements, or both.

19. A method for controlling a movement of a device based on a state of the device tracked using measurements of the movement indicative of the state of the device, the method comprising:
collecting a sequence of measurements indicative of the state of the device at different control steps;
executing iteratively, a compound probabilistic filter configured to track the state of the device at each of the different control steps using the sequence of measurements to produce a sequence of states of the device corresponding to the sequence of measurements, wherein to perform an iteration for a current control step using a current measurement, the compound probabilistic filter is configured to:
execute multiple probabilistic filters parameterized on the state of the device to produce multiple estimates of the state of the device for the current control step, wherein each of the multiple probabilistic filters iteratively predicts a current state of the device using a prediction model subject to process noise and updates the predicted current state based on the current measurement using a measurement model subject to a measurement noise, wherein different probabilistic filters of the multiple probabilistic filters have different measurement noises causing variations in the multiple estimates of the state of the device;
estimate, for each of the multiple probabilistic filters, a likelihood of corresponding measurement noise to correlate the current measurement with the predicted current state;
combine the multiple estimates of the state of the device into a weighted combination with normalized weights derived from the likelihoods estimated for corresponding probabilistic filters; and
output the state of the device tracked by the compound probabilistic filter for the current control step based on the weighted combination; and
controlling the device using the sequence of states tracked by the compound probabilistic filter.

20. A non-transitory computer-readable storage medium embodied thereon a program executable by a processor for performing a method for controlling a movement of a device based on a state of the device tracked using measurements of the movement indicative of the state of the device, the method comprising:
collecting a sequence of measurements indicative of the state of the device at different control steps;
executing iteratively, a compound probabilistic filter configured to track the state of the device at each of the different control steps using the sequence of measurements to produce a sequence of states of the device corresponding to the sequence of measurements, wherein to perform an iteration for a current control step using a current measurement, the compound probabilistic filter is configured to:
execute multiple probabilistic filters parameterized on the state of the device to produce multiple estimates of the state of the device for the current control step, wherein each of the multiple probabilistic filters iteratively predicts a current state of the device using a prediction model subject to process noise and updates the predicted current state based on the current measurement using a measurement model subject to a measurement noise, wherein different probabilistic filters of the multiple probabilistic filters have different measurement noises causing variations in the multiple estimates of the state of the device;

estimate, for each of the multiple probabilistic filters, a likelihood of corresponding measurement noise to correlate the current measurement with the predicted current state;

combine the multiple estimates of the state of the device into a weighted combination with normalized weights derived from the likelihoods estimated for corresponding probabilistic filters; and output the state of the device tracked by the compound probabilistic filter for the current control step based on the weighted combination; and controlling the device using the sequence of skates tracked by the compound probabilistic filter.

* * * * *